US009760296B2

United States Patent
Suzuki et al.

(10) Patent No.: US 9,760,296 B2
(45) Date of Patent: Sep. 12, 2017

(54) STORAGE DEVICE AND METHOD FOR CONTROLLING STORAGE DEVICE

(71) Applicant: Hitachi, Ltd., Tokyo (JP)

(72) Inventors: Takanobu Suzuki, Tokyo (JP); Norio Shimozono, Tokyo (JP); Hiroaki Akutsu, Tokyo (JP); Kohei Tatara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 36 days.

(21) Appl. No.: 14/767,019

(22) PCT Filed: May 20, 2013

(86) PCT No.: PCT/JP2013/063889
§ 371 (c)(1),
(2) Date: Aug. 11, 2015

(87) PCT Pub. No.: WO2014/188479
PCT Pub. Date: Nov. 27, 2014

(65) Prior Publication Data
US 2015/0378629 A1    Dec. 31, 2015

(51) Int. Cl.
G06F 3/06 (2006.01)
G06F 12/10 (2016.01)
G06F 11/07 (2006.01)

(52) U.S. Cl.
CPC .......... *G06F 3/0619* (2013.01); *G06F 3/0644* (2013.01); *G06F 3/0683* (2013.01);
(Continued)

(58) Field of Classification Search
CPC .... G06F 3/0619; G06F 3/0644; G06F 3/0683; G06F 11/0751; G06F 11/0727; G06F 12/10; G06F 2212/1032
See application file for complete search history.

(56) References Cited

U.S. PATENT DOCUMENTS 5,819,054 A      10/1998  Ninomiya et al.
2005/0262300 A1*  11/2005  Mannen ................ G06F 3/0623
                                                    711/114

(Continued)

FOREIGN PATENT DOCUMENTS

JP          7-20994 A        1/1995
JP       2000-347815 A      12/2000

(Continued)

OTHER PUBLICATIONS

International Search Report of PCT/JP2013/063889.

*Primary Examiner* — Hiep Nguyen
(74) *Attorney, Agent, or Firm* — Mattingly & Malur, PC

(57) ABSTRACT

To detect an abnormality of logical and physical addresses, a storage device includes: plural drives each having a storage medium configuring a logical volume provided to a host device; a front end I/F that receives an I/O request including a logical address for identifying a logical storage area of the logical volume, and user data from the host computer; a processor that controls conversion from the logical address into the physical address for identifying a physical storage area of the storage medium; and a back end I/F that controls write/read of user data with respect to the drives based on the physical address. In the drives, data where a first guarantee code obtained based on the physical address and the logical address corresponding to the physical address is added to the user data is stored in the physical storage area designated by the physical address of the storage medium.

14 Claims, 30 Drawing Sheets

(52) U.S. Cl.
CPC ...... *G06F 11/0727* (2013.01); *G06F 11/0751* (2013.01); *G06F 12/10* (2013.01); *G06F 2212/1032* (2013.01)

(56) References Cited

U.S. PATENT DOCUMENTS

| | | | | |
|---|---|---|---|---|
| 2006/0101202 | A1* | 5/2006 | Mannen | G06F 11/1076 711/114 |
| 2008/0195832 | A1* | 8/2008 | Takada | G06F 3/0611 711/171 |
| 2008/0201622 | A1* | 8/2008 | Hiew | G11C 29/56 714/718 |
| 2009/0083610 | A1 | 3/2009 | Arai et al. | |
| 2009/0254507 | A1 | 10/2009 | Hosoya et al. | |
| 2011/0191537 | A1* | 8/2011 | Kawaguchi | G06F 3/0605 711/114 |
| 2012/0102260 | A1* | 4/2012 | Kawamura | G06F 3/0608 711/103 |

FOREIGN PATENT DOCUMENTS

| | | |
|---|---|---|
| JP | 2009-80696 A | 4/2009 |
| JP | 2009-251725 A | 10/2009 |

* cited by examiner

| LDEV# | LDEV LBA | CACHE MEMORY ADDRESS |
|---|---|---|
| 2 | 0 | 0 |
|  | Not-allocated |  |
|  | ... | ... |
|  | 999 | 10 |
| 3 | 0 | 11 |
|  | Not-allocated |  |
|  | ... | ... |
|  | 499 | 22 |

FIG.28

| Pool# (14231) | VVOL# (14232) | VVOL LBA (14233) | LDEV# (14234) | LDEV LBA (14235) |
|---|---|---|---|---|
| 0 | 1 | 0 | 1 | 0 |
| | | 1 | 1 | 1 |
| | | 2 | 1 | 33 |
| | | 3 | Not-Allocate | |
| | | ... | ... | ... |
| | 2 | 0 | 2 | 0 |
| | | 1 | 2 | 3 |
| | | ... | ... | ... |

| Pool# (14241) | LDEV# (14242) | LDEV LBA (14243) | ALLOCATED FLAG (14244) |
|---|---|---|---|
| 0 | 1 | 0 | 1 |
| | | 1 | 1 |
| | | 2 | 1 |
| | | 3 | Not-Allocated |
| | | ... | ... |
| | 2 | 0 | 2 |
| | | 1 | 2 |
| | | ... | ... |

1424

STORAGE DEVICE AND METHOD FOR CONTROLLING STORAGE DEVICE

BACKGROUND

The present invention relates to a storage device that stores data in a drive device.

In a storage device requiring a high performance and a high reliability, an RAID (redundant array independent (inexpensive) disks) is configured by a plurality of mounted disk devices, and a storage area is provided to a host device such as a host computer as one or a plurality of virtual disk devices to improve speed-up and redundancy. The host computer designates a logical address of the provided virtual disk devices, and transmits and receives data with respect to the storage device. On the other hand, the storage device that has received the designation of the logical address internally converts the logical address into a physical address indicative of an address of a real disk device, and writes and reads data with respect to the disk device.

In order to improve the reliability of data transfer associated with the above address conversion, for example, Japanese Unexamined Patent Application Publication No. 2000-347815 discloses that when data is stored in the disk device, a guarantee code disk side LA (logical address) calculated on the basis of the logical address of a write destination is written with the addition to the data, and LA is checked when reading the data, to thereby detect an address abnormality such that the data is written in an erroneous address.

SUMMARY

However, in a method of detecting the address abnormality disclosed in Japanese Unexamined Patent Application Publication No. 2000-347815, it is possible to detect that the data is written in a physical storage area different from the physical storage area designated by a designated physical address. However, there arises such a problem that the abnormality of the logical address cannot be detected even if the data is written in the physical storage area different from the physical storage area corresponding to the designated logical address. This abnormality of the logical address is liable to occur when converting from the logical address to the physical address. With an increase in the capacity of data in recent years, a thin provisioning function for dynamically allocating a storage area of a logical volume to a virtual volume, and a virtualization function of the storage device for providing the virtual volume integrating the storage areas of a plurality of storage devices have been rapidly popularized. In those functions, the logical addresses and the physical addresses are fixedly associated with each other, and a correspondence relationship is dynamically changed. Also, an address conversion is complicated, and the number of address conversions by one access is increased. From this viewpoint, in order to further enhance the reliability of data, a need to detect the logical address abnormality is enhanced.

According to the present invention, there is provided a storage device including: a plurality of drives each having a storage medium configuring a logical volume provided to a host device; a front end I/F that receives an I/O request including a logical address for identifying a logical storage area of the logical volume from the host computer, and user data; a processor that controls a conversion from the logical address into the physical address for identifying a physical storage area of the storage medium; and a back end I/F that controls write/read of user data with respect to the plurality of drives on the basis of the physical address. In the drives, data in which a first guarantee code obtained on the basis of the physical address and the logical address corresponding to the physical address is added to the user data is stored in the physical storage area designated by the physical address of the storage medium.

According to the present invention, the abnormality of the logical address can be detected, and the reliability of data in the storage device can be further improved.

BRIEF DESCRIPTION OF THE DRAWINGS

FIG. 28 is a diagram illustrating a structure of an address mapping table according to the second embodiment;

FIG. 29 is a diagram illustrating a configuration of an LDEV free block management table according to the second embodiment;

DETAILED DESCRIPTION

Several embodiments will be described with reference to the accompanying drawings. The embodiments described below do not limit the claimed invention, but all of various elements described in the embodiments, and the combinations thereof are not always necessary for a technical solution of the invention.

In the following description, various pieces of information may be described by an expression of "XX table", but various pieces of information may be expressed by a data structure other than the table. In order to indicate that the information does not depend on the data structure, "XX table" may be called "XX information".

Also, in the following description, processing may be described with a hardware as a subject, but a program is executed by the hardware per se, or a processor (for example, MP (microprocessor)) provided in the hardware so that given processing is appropriately conducted with the use of a storage resource (for example, a memory) and/or a communication interface device (for example, a port). Therefore, the subject of the processing may be the program. Also, a program source may be a program distribution server or a storage media.

First Embodiment

An outline of a computer system 1 including a storage system according to a first embodiment will be described. The storage system is configured by, for example, a storage device 100 illustrated in FIG. 1. A plurality of drive devices 180 is provided in a DKU 170 of the storage device 100. In the storage device 100, storage areas of the plurality of drive devices 180 configure a logical volume. The logical volume is referred from a host computer 10.

Figure 1:
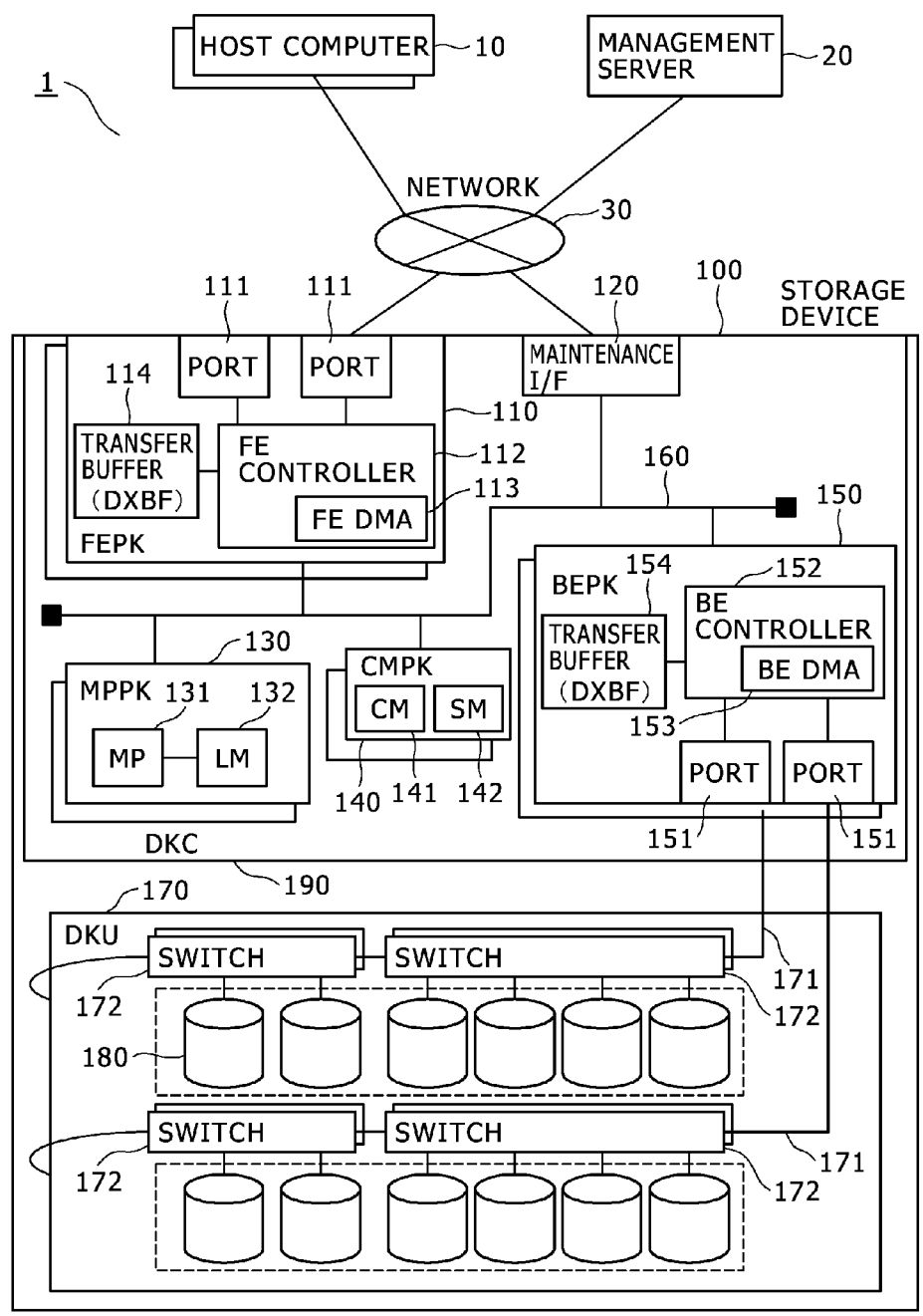
FIG. 1 is a diagram illustrating a hardware configuration of a computer system according to a first embodiment.

FIG. 1 is a diagram illustrating a hardware configuration of the computer system 1 according to the first embodiment. The computer system 1 includes one or more host computers (hereinafter hosts) 10, a management server 20, and the storage device 100. Each of the hosts 10, the management server 20, and the storage device 100 are connected to each other through a network 30. The network 30 may be configured by a local area network (LAN) or a wide area network (WAN). The host 10 is, for example, a computer that executes an application, and read data necessary for an application from the storage device 100, or writes data created by the application. The management server 20 is a computer that executes an application for managing the computer system 1, which is used by a manager who executes management processing of the system. A storage system is configured by, for example, the storage device 100 illustrated in FIG. 1. The storage device includes a DKC (disk controller) 190 and a DKU (disk unit) 170. The DKC 190 includes one or more front end packages (FEPKs) 110, a maintenance interface (maintenance I/F) 120, one or more microprocessor packages (MPPKs) 130, one or more cache memory packages (CMPKs) 140, one or more back end packages (BEPKs) 150, and an internal network 160. The FEPK 110, the maintenance I/F 120, the MPPK 130, the CMPK 140, and the BEPK 150 are connected to each other through the internal network 160. The BEPK 150 is connected to the DKU 170 through passes 171 and switches 172 of plural systems. The DKU 170 is equipped with the plurality of drive devices 180.

The FEPK 110 exemplifies an interface device of a front end, and includes one or more ports 111, a front end controller (FE controller) 112, a DMA (FE DMA) 113, and a front end transfer buffer (FE DXBF) 114. The ports 111 are connected to a variety of devices through the network or the like. The maintenance I/F 120 is an interface for connecting the storage device 100 to the management server 20. The front end transfer buffer (FE DXBF) 114 temporally stores data transmitted from the hosts 10, or data to be transmitted to the host 10. The FE controller 112 communicates a variety of commands, write data, or read data with the host 10. The FE DMA 113 communicates the variety of commands or data between the FE DXBF 114 and a CM 141.

Each of the MPPKs 130 includes a microprocessor (MP) 131, and a local memory (LM) 132. The LM 150 stores a variety of programs and various pieces of information therein. The MP 131 executes the programs stored in the LM 132 to execute a variety of processing. The MP 131 transmits a variety of commands (for example, a read command or a write command in an SCSI) to the drive devices 180 of the DKU 170 through the BEPK 150, and also receives results of the various commands from the drive devices 180 of the DKU 170. Also, the MP 131 transmits the variety of commands to an external storage device through the FEPK 110.

The CMPK 140 has the cache memory (CM) 141 and a shared memory (SM) 142. The CM 141 is a memory for temporarily storing data (write data) to be written into the drive from the host 10, or data (read data) read from the drive therein. The SM 142 is a memory for storing control information for allowing the variety of programs to conduct processing.

The BEPK 150 exemplifies an interface device of a back end, and includes one or more ports 151, a back end controller (BE controller) 152, a DMA (BE DMA) 153, and a back end transfer buffer (BE DXBF) 154. The ports 151 connect the storage device 100 to the drive devices 180 through a network or the like. The back end transfer buffer (BE DXBF) 154 temporarily stores data transmitted from the drive devices 180, and data to be transmitted to the drive devices 180 therein. The BE controller 152 communicates a variety of commands, write data, or read data with the drive devices 180 of the DKU 170. The BE DMA 153 communicates the variety of commands and data between the BE DXBF 154 and the CM 141.

Figure 2:
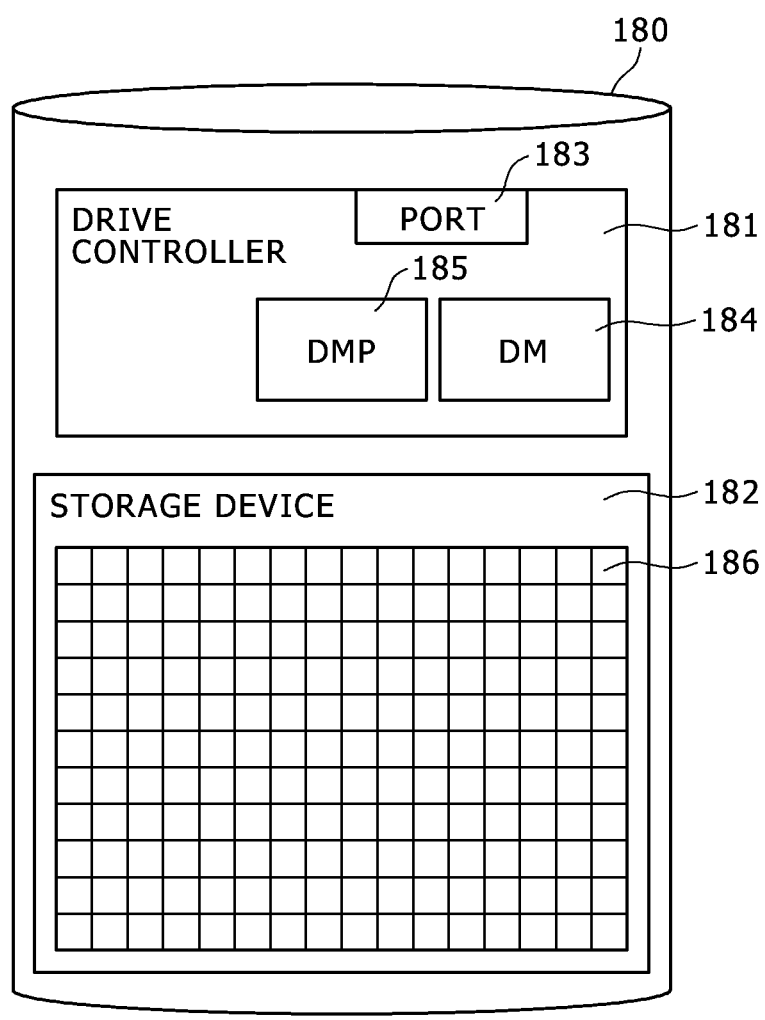
FIG. 2 is a diagram illustrating a logical configuration of a drive of a computer system according to the first embodiment.

FIG. 2 is a diagram illustrating a hardware configuration of the drive device 180 of the computer system 1 according to the first embodiment. Each of the drive devices 180 has one or more drive controllers 181, and one or more storage devices 182. Each of the drive controllers 181 includes one or more ports 183, a cache memory 184 (called "DM"), and a microprocessor 185 (called "DMP"). The drive devices 180 are each connected to any switch 172 through the port 183. The storage device 182 is made of a nonvolatile storage medium, which is, for example, a storage medium such as a magnetic disk, a flash memory, or a semiconductor memory (PRAM, ReRAM, etc.). Each of the drive devices 180 can deliver data with respect to the storage device 100 with a block 186 (for example, 512B) which is a minimum unit of SCSI command processing as a unit. Also, with the use of the drive device 180 having the drive controller 181, processing that has been conducted by the DKC 190 up to now can be conducted by the drive controller 181, a load of the DKC 190 can be reduced, and an improvement in the I/O performance can be anticipated. However, the drive devices 180 can be replaced with an HDD (hard disk drive) or an SSD (solid state drive). In this situation, processing such as arithmetic operation which is conducted by the drive controller 181 may be conducted by the DKC 190 instead of the drive controller 181.

Figure 3:
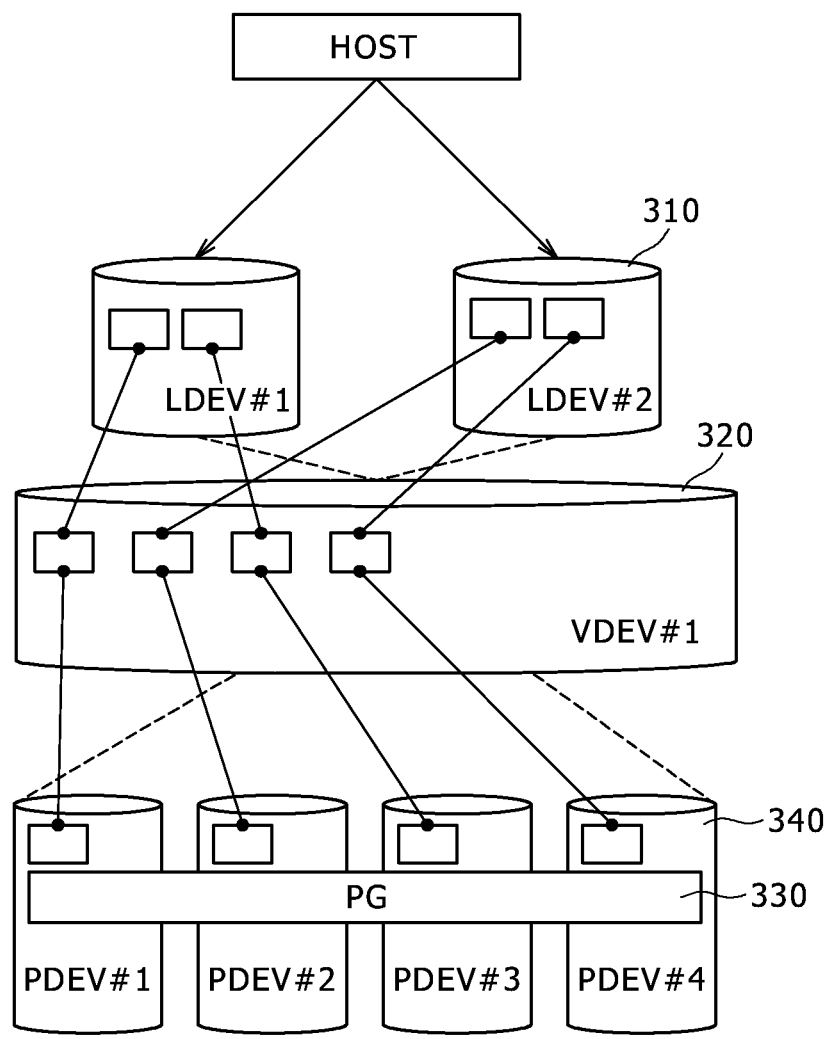
FIG. 3 is a diagram illustrating a logical configuration of the computer system according to the first embodiment.

FIG. 3 is a diagram illustrating a logical configuration of the computer system 1 according to the first embodiment. The storage device 100 bundles the plurality of drive devices 180 (called "PDEV 340") to configure an RAID (Redundant Array of Independence (Inexpensive) Disks) group 330 (called "PG"), thereby ensuring a redundancy of data. For example, the storage device 100 bundles four PDEVs 340 to configure a PG 330. The RAID has several levels (hereinafter referred to as "RAID level"). For example, in RAID 5, in order to rebuild data that has not been read from the drive device due to a failure occurring in the drive device, redundant information (hereinafter referred to as "redundant code") called "parity" is generated in each data, and the redundant code is also written into the drive device. The RAID levels other than RAID 5 are present (for examples, RAIDS 1 to 4, 6, etc.), and as a redundant technique of data, there is a triple parity technique using a triplication and three parities. A PG 330 virtually regarded as one volume is called "VDEV 320". An LDEV 310 is a virtual device, and referred to from the host 10 with the use of a host LBA. Also, a PDEV 340 is referred to with the use of a physical LBA. A storage device manager creates the LDEV 310 through the maintenance I/F 120. The LDEV 310 is configured by allocating a plurality of blocks (one unit of a storage area in PDEV) of PDEV 340 configuring the VDEV 320. In this example, a physical LBA and a host LBA are not limited to the LBA designating the block, but may be information that can identify the respective storage areas of the PDEV 340 and the LDEV 310 such as the physical address and the logical address. Also, in the storage system, the LDEV 310, the VDEV 320, and the PDEV 340 each have a unique number (LDEV#, VDEV#, PDEV#).

Figure 4:
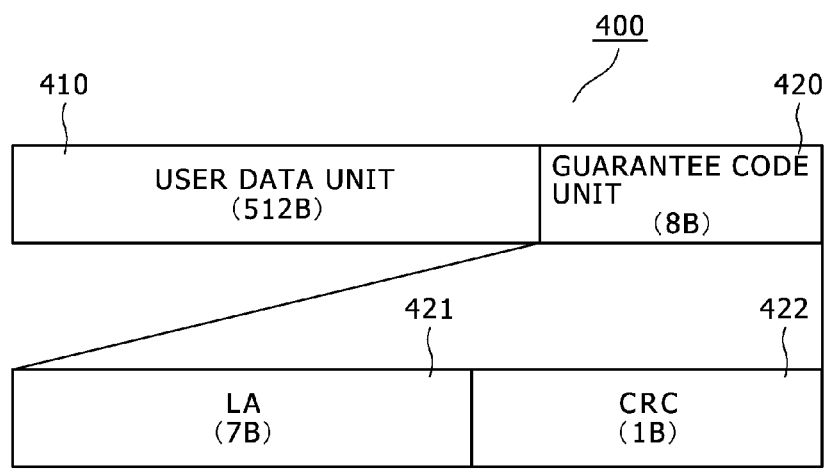
FIG. 4 is a diagram illustrating a configuration of a data block according to the first embodiment.

FIG. 4 is a diagram illustrating a configuration of a data block 400 according to the first embodiment.

Data is transferred and stored in the PDEV 340 with the data block 400 as one unit. The data block 400 includes a user data portion (for example, 512B) 410 and a guarantee code portion (for example, 8B) 420. A part of the guarantee code portion 420 is used as an LA area 421, and the remaining part is used as a CRC area 422 for bit error correction. The size of the user data portion 410 and the guarantee code portion 420 is arbitrary, and does not always need to be set as described above. Also, an overall area of the guarantee code portion 420 may be used as an LA.

In this example, the LA calculated from the host LBA is set as an FLA. As the FLA, for example, the host LBA may be used as it is, or used as a hash value of the host LBA. The LA calculated from the host LBA is set as an FLA. As the BLA, for example, the physical LBA may be used as it is, or used as a hash value of the physical LBA. It is assumed that an XOR value of the FLA and the BLA is an MLA. In this example, the MLA does not always need to be the XOR value of the FLA and the BLA, and may store, for example, both of FLA and BLA in the LA area. In addition, the MLA needs to be set to a value for confirming whether an address error occurs at the time of I/O, or not, by comparison to a given FLA or/and BLA.

Hereinafter, a table structure according to the present invention will be described. The table described below may be configured by a pointer structure or a hash table, or may have a reverse table for the purpose of reducing a memory usage or a retrieval time.

Figure 5:
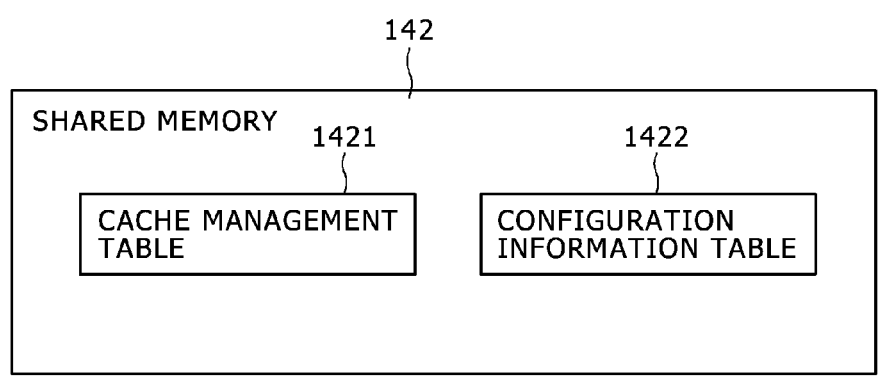
FIG. 5 is a diagram illustrating a configuration of a shared memory according to the first embodiment.

FIG. 5 is a diagram illustrating a table stored in the SM 142 according to the first embodiment. In the first embodiment, the SM 142 ensures an area on the CMPK 140, but may configure the logical SM 142 with the use of the storage areas of the plural configurations such as the drive devices 180 and the LM 132. The SM 142 stores a cache management table 1421 and a configuration information management table 1422 therein.

Figure 6:
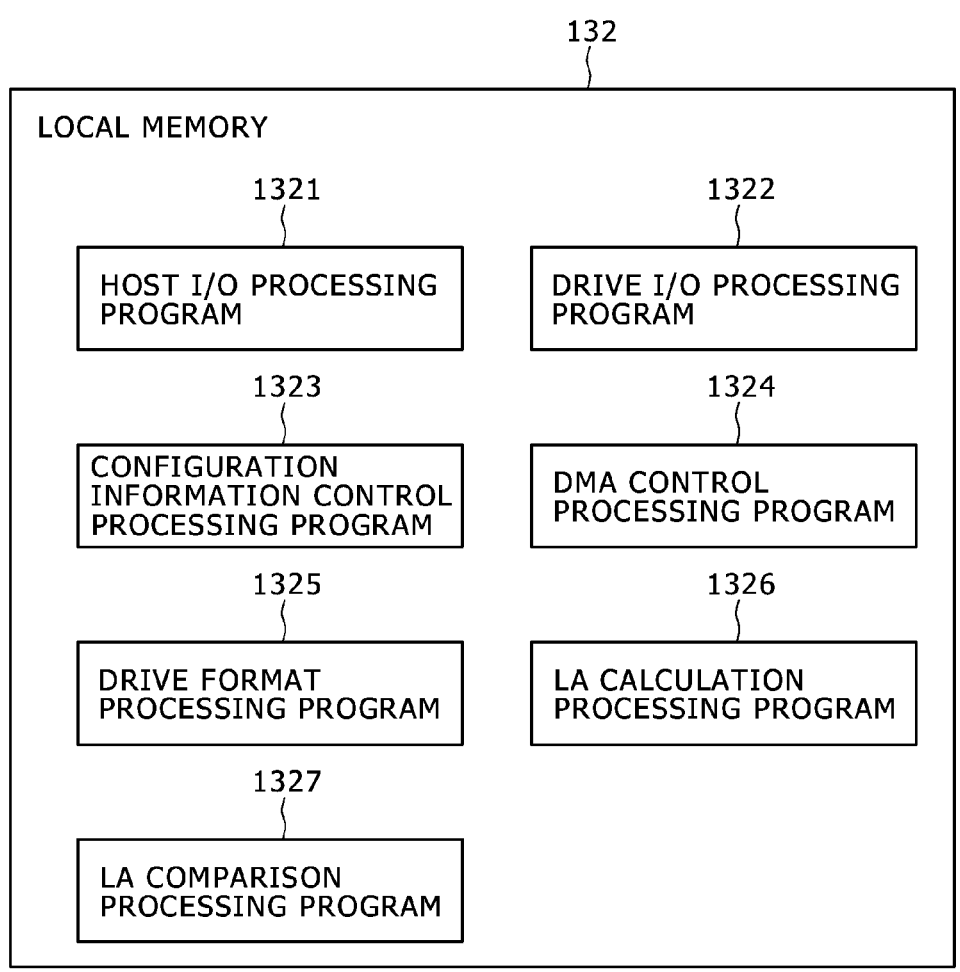
FIG. 6 is a diagram illustrating a configuration of a local memory according to the first embodiment.

FIG. 6 is a diagram illustrating a configuration of the local memory 132 according to the first embodiment. The LM 132 stores a host I/O processing program 1321, a drive I/O processing program 1322, a configuration information control processing program 1323, a DMA control processing program 1324, a drive format processing program 1325, an LA calculation processing program 1326, and an LA inspection processing program 2135 therein. The host I/O processing program 1321 is a program for executing host read/host write processing.

Figures 7, 8:
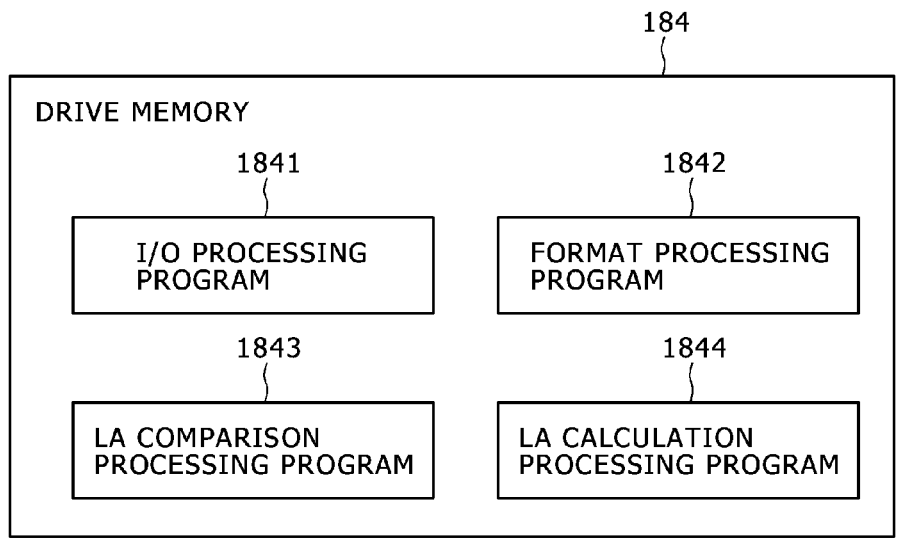
FIG. 7 is a diagram illustrating a configuration of a drive memory according to the first embodiment.
FIG. 8 is a diagram illustrating a configuration of a cache management table according to the first embodiment.

FIG. 7 is a diagram illustrating a configuration of the drive memory 184 of each drive device 180 according to the first embodiment. The drive memory 184 stores an I/O processing program 1841, a format processing program 1842, an LA calculation processing program 1843, and an LA inspection processing program 1844 therein. The I/O processing program 1841 is a program for executing the read/write processing.

FIG. 8 is a diagram illustrating a configuration of the cache management table 1421 in the computer system 1 according to the first embodiment. The cache management table 1421 is information indicative of a correspondence relationship of LDEV#, LDEV LBA, and the physical address of the cache memory. When an LDEV#14211 stores LDEV# therein, an LDEV LBA 14212 stores LDEV LBA therein, and a cache memory address 14213 stores, when data of a block indicated by the corresponding LDEV LBA is stored in the cache memory, an address on the cache memory in which the data is stored therein. For example, because the cache memory is allocated to LDEV LBA0 of LDEV#2, an address of the corresponding cache memory is stored on a row in which LDEV LBA0 of LDEV#2 is stored. Because the cache memory is not allocated to LDEV LBA1 of LDEV#2, a constant (corresponding to not-allocated in row 14213) indicating that the cache memory is not allocated in the row in which LDEV LBA1 of LDEV#2 is stored. In this table, the MP 131 can check whether data of a block corresponding to the LDEV LBA used for an access by the host 10 is present on the cache, or not.

Figure 9:
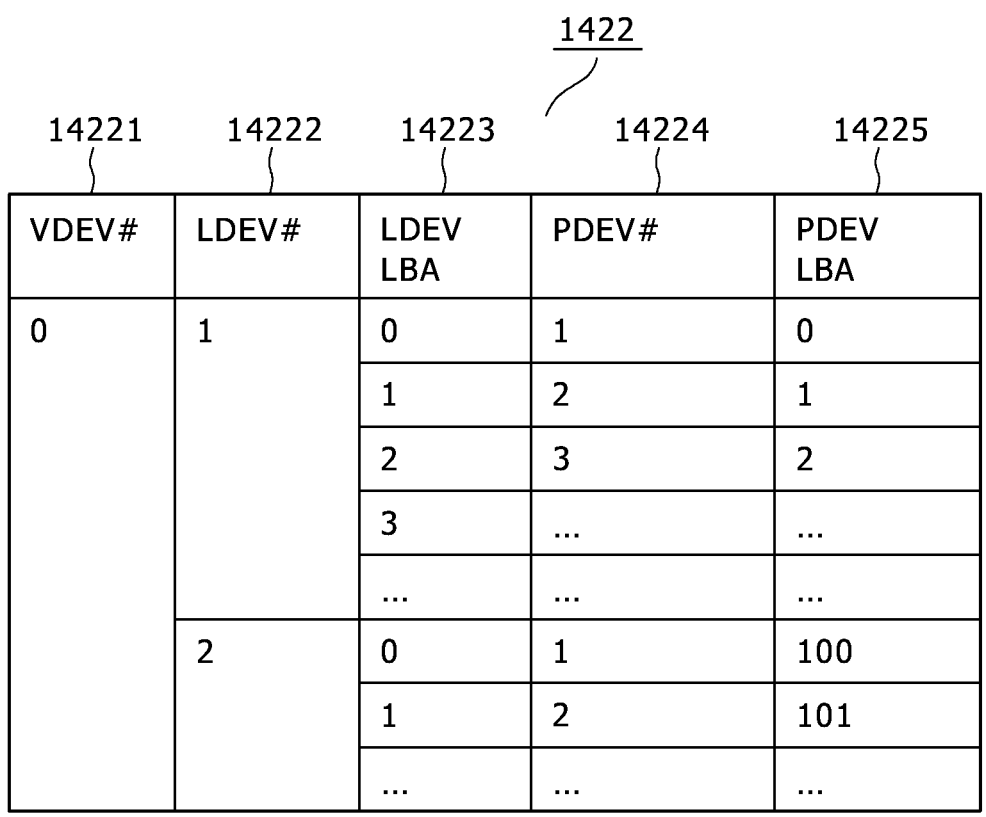
FIG. 9 is a diagram illustrating a configuration of a configuration information table according to the first embodiment.

FIG. 9 is a diagram illustrating a configuration of the configuration information table 1422 in the computer system 1 according to the first embodiment. The configuration information table 1422 is information indicative of a correspondence relationship of VDEV#14221, LDEV#14222, an address (host LBA) 14223 of the LDEV 310, PDEV#14224, and an address (physical LBA) 14225 of the PDEV 340. The configuration information management table 1422 includes a row 14221 that stores VDEV# therein, a row 14222 that stores LDEV# therein, a row 14223 that stores LDEV LBA therein, a row 14224 that stores PDEV# therein, and a row 14225 that stores PDEV LBA (physical LBA) therein. The host 10 designates LDEV LBA as the host LBA when accessing to the storage device. However, in this table, the MP 131 can check which physical LBA the LDEV LBA used for an access by the host 10 corresponds to.

Figure 10:
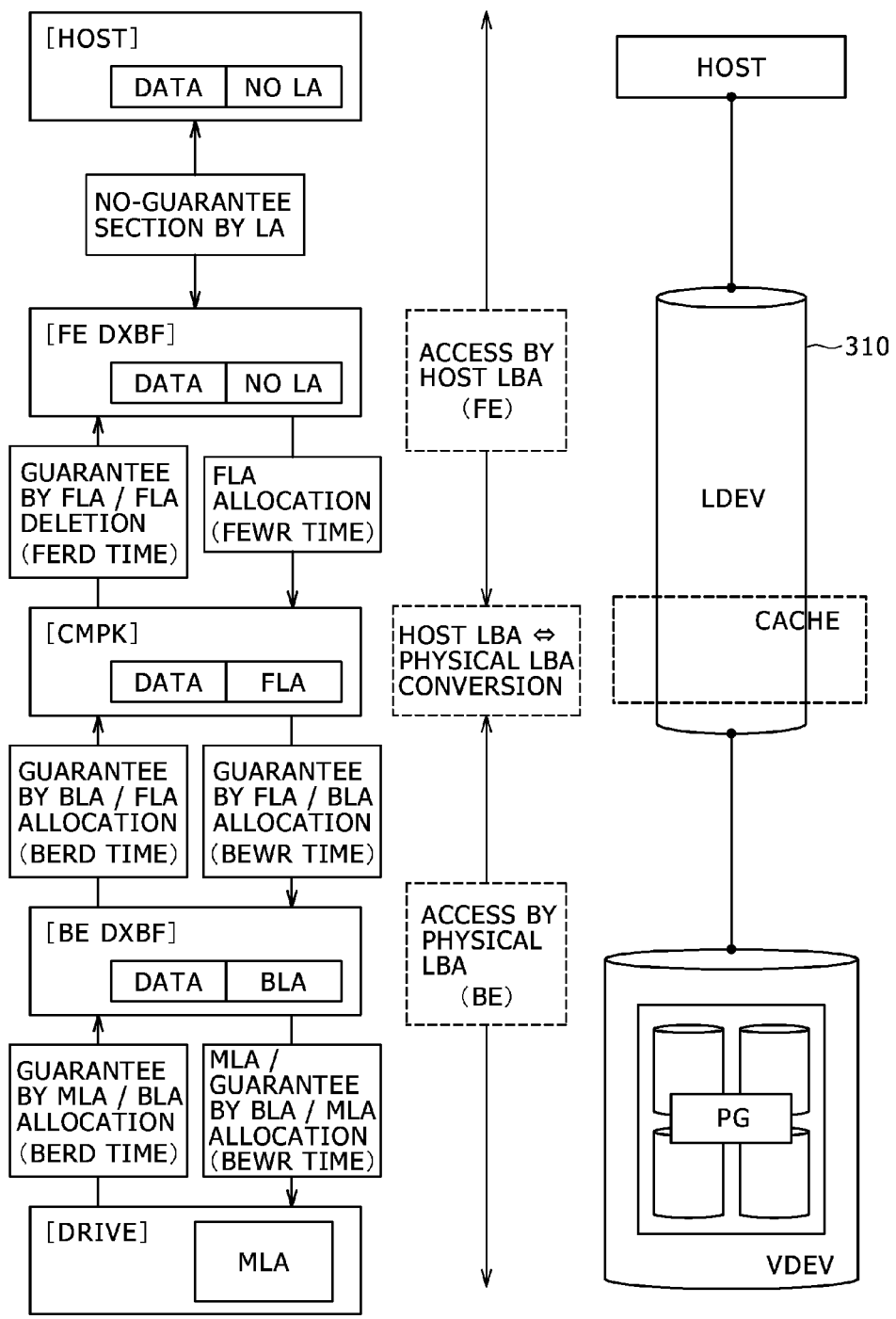
FIG. 10 is a diagram illustrating a correspondence between a data guarantee range by an LA and a logical system configuration according to the first embodiment.

FIG. 10 is a diagram illustrating a correspondence between a data guarantee range by the LA and a logical system configuration in the computer system 1 according to the first embodiment. In data transfer within the storage device 100, a guarantee code (hereinafter called "MLA") obtained by synthesizing a guarantee code (hereinafter referred to as "FLA") calculated from a logical address of the logical volume (LDEV 310) which is referred to by the host 10, and a guarantee code (hereinafter called "BLA") calculated from the physical address of the drive device 180, is added to data, resulting in such an advantage that an I/O of an abnormal address is detected to prevent data corruption or read of erroneous data. When the host 10 reads data from the storage device 100, if intended data is present within the drive device 180, the data is transferred from the drive device 180 to the BE DXBF 154. Thereafter, the data is transferred from the BE DXBF 154 to the CM 141, from the CM 141 to the FE DXBF 114, and thereafter transferred to the host 10 through the ports 111. The MP 131 converts the host LBA used for an access to data by the host 10 into the physical LBA with the use of the configuration information table 1422. The MP 131 uses the physical LBA for an access to data within the physical drive device 180. The data within the drive device 180 is protected by the MLA. When transferring data from the drive device 180 to the BE DXBF 154, the DMP 185 in the drive device 180 confirms that the MLA obtained from the BLA and FLA related to the access matches the MLA stored in the read destination from the storage device 182, that is, that the MLA is normal, and changes the guarantee code of the read data from the MLA to the BLA. When the BE DMA 153 transfers the data from the BE DXBF 154 to the CM 141, the BE DMA 153 confirms that the BLA is normal, and adds the FLA given from the MP 131 to the data. After the data has been stored in the CM 141, the MP 131 updates the cache management table 1421 on the SM 142 (hereinafter, the above back end read processing is called "BERD processing"). When the FE DMA 113 transfers the data on the CM 141 to the FE DXBF 114, the FE DMA 113 confirms that the FLA is normal, and excludes the FLA. The data transferred to the FE DXBF 114 is transferred to the host 10 by the FE controller 112 (hereinafter, the above front end read processing is called "FERD processing"). When intended data is on the CM 141, only the FERD processing is conducted.

When the host 10 writes data into the storage device 100, write data transferred from the host 10 is received by the FE DXBF 114, and transferred to the CM 141 by the FE DMA 113. When transferring data to the CM 141, the MP 131 inputs the FLA calculated by the host LBA to the FE DMA 113, and the FE DMA 113 adds the FLA to the data. Thereafter, the FE DMA 113 transfers the data from the FE DXBF 114 to the CM 141. After storing the data in the CM 141, the MP 131 updates the cache management table 1421 (hereinafter, the above front end write processing is called "FEWR processing"). When writing the data into the drive device 180 from the CM 141 through the BE DXBF 154, the MP 131 converts the host LBA into the physical LBA. When transferring the data from the CM 141 to the BE DXBF 154, the BE DMA 153 confirms that the FLA is normal, and then adds the BLA input from the MP 131 to the data. The data transferred from the BE DXBF 154 to the drive device 180 is temporarily retained in the DM 184. The DMP 185 confirms that the MLA stored in the write destination physical LBA is normal according to the BLA added to the data, the FLA added to a drive write command issued to the drive device 180 by the DKC 190, and the write destination physical LBA in the drive write command, and thereafter the DMP 185 adds the MLA to the data, and writes the data (hereinafter, the above back end write processing is called "BEWR processing").

Figure 11:
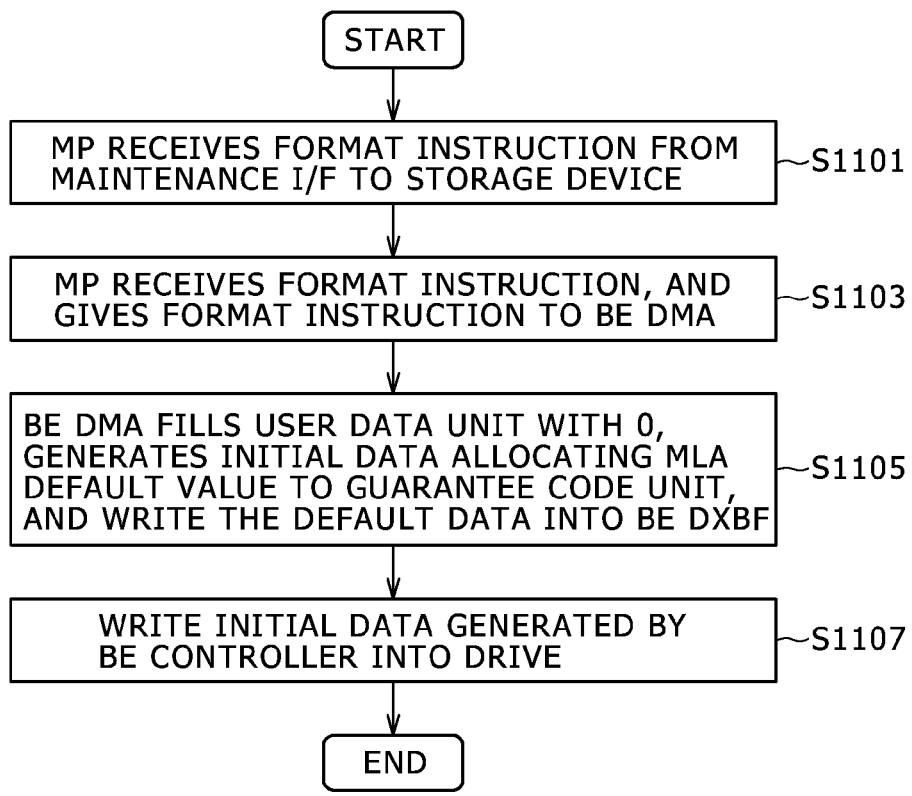
FIG. 11 is a flowchart illustrating drive format processing according to the first embodiment.

FIG. 11 is a flowchart illustrating drive format processing in the computer system 1 according to the first embodiment. The drive format processing (also merely called "format processing") is executed when the storage device receives a drive format instruction through the maintenance I/F 120.

In the drive format processing, when the MP 131 receives a format instruction from the maintenance I/F 120 (Step 1101), the MP 131 that has received the format instruction first instructs the BE DMA 153 to create format data added with an MLA default value (Step 1103). In the format data, an overall area of the user data portion 410 in FIG. 4 is set to 0, and the BLA obtained from the physical address of the drive device is recorded as the MLA default value in the LA area 421 of the guarantee code portion 420. In this example, the MLA default value does not always need to be BLA, and may be any value which can be discriminated as the default value.

The BE DMA 153 writes the created data into the BE DXBF 154 (Step 1105). The BE controller 152 writes the format data written in the BE DXBF 154 into the drive device 180 (Step 1107), and the drive format processing is completed. Upon completing the drive format processing, the data transmitted from the host 10 can be written into the drive device 180.

Figure 12:
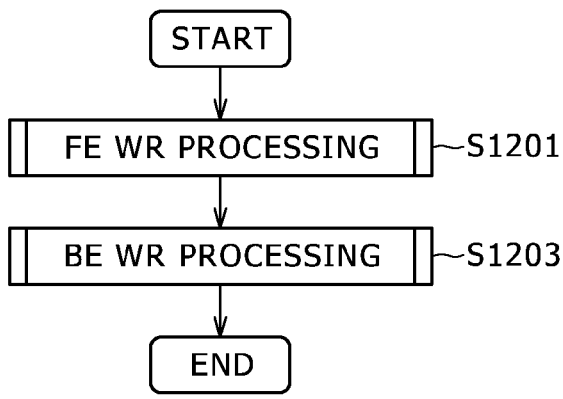
FIG. 12 is a flowchart illustrating host write processing according to the first embodiment.

FIG. 12 is a flowchart illustrating host write processing of the computer system 1 according to the first embodiment. The host write processing includes front end write processing (Step 1201, hereinafter called "FEWR processing") which is processing for allowing the FE DMA 113 to write the data transmitted from the host 10 into the cache, and back end write processing (Step 1203, hereinafter called "BEWR processing") for allowing the BE controller 152 to write data in the cache into the drive.

Figure 13:
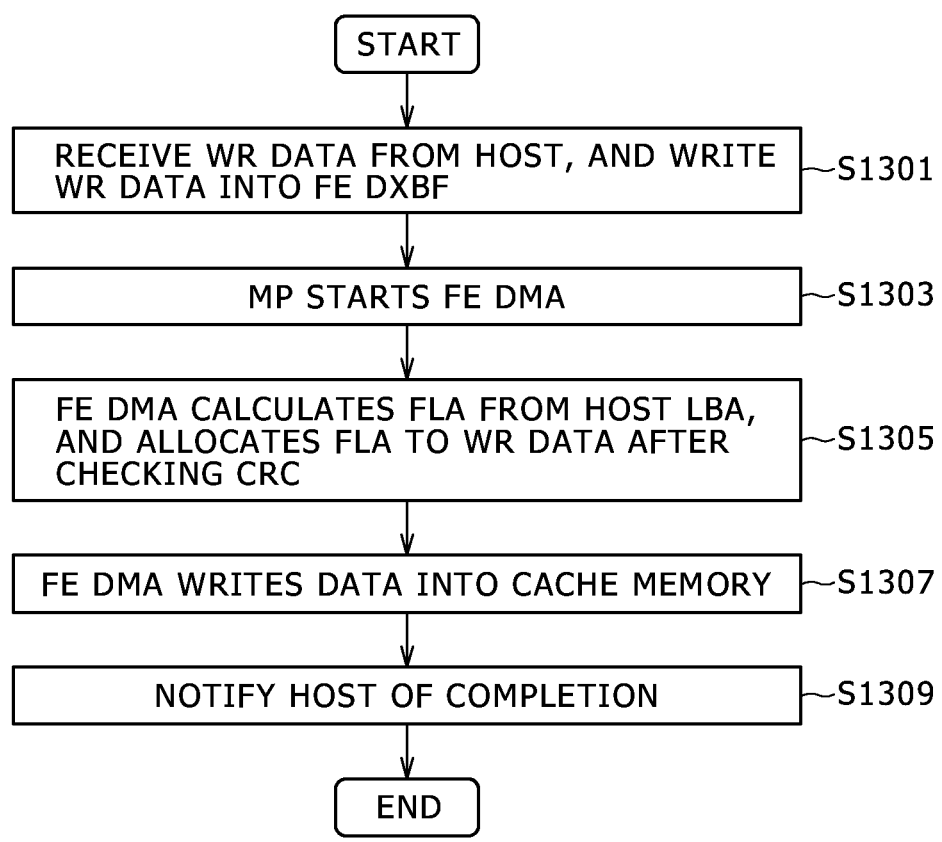
FIG. 13 is a flowchart illustrating front end write processing according to the first embodiment.

FIG. 13 is a flowchart illustrating the front end write processing in the computer system 1 according to the first embodiment. The FEWR processing is executed when the MP 131 receives a write command from the host 10 through the ports 111 of the FEPK 110.

The FE controller 112 receives write data transmitted from the host 10, and writes the write data into the FE DXBF 114 (Step 1301). No LA is added to the write data in the stored FE DXBF 114. Then, the MP 131 starts the FE DMA 113 (Step 1303). When data is transferred from the FE DXBF 114 to the CM 141, the FE DMA 113 calculates the FLA on the basis of an LDEV LBA (hereinafter called "host LBA") input from the MP 131, and adds the FLA to data (Step 1305). CRC check is conducted together with the FLA addition, but the order of the FLA addition and the CRC check is no object. The MP 131 writes the data added with the FLA into the CM 141 (Step 1307), and transmits a completion report to the host 10 (Step 1309).

Figure 14:
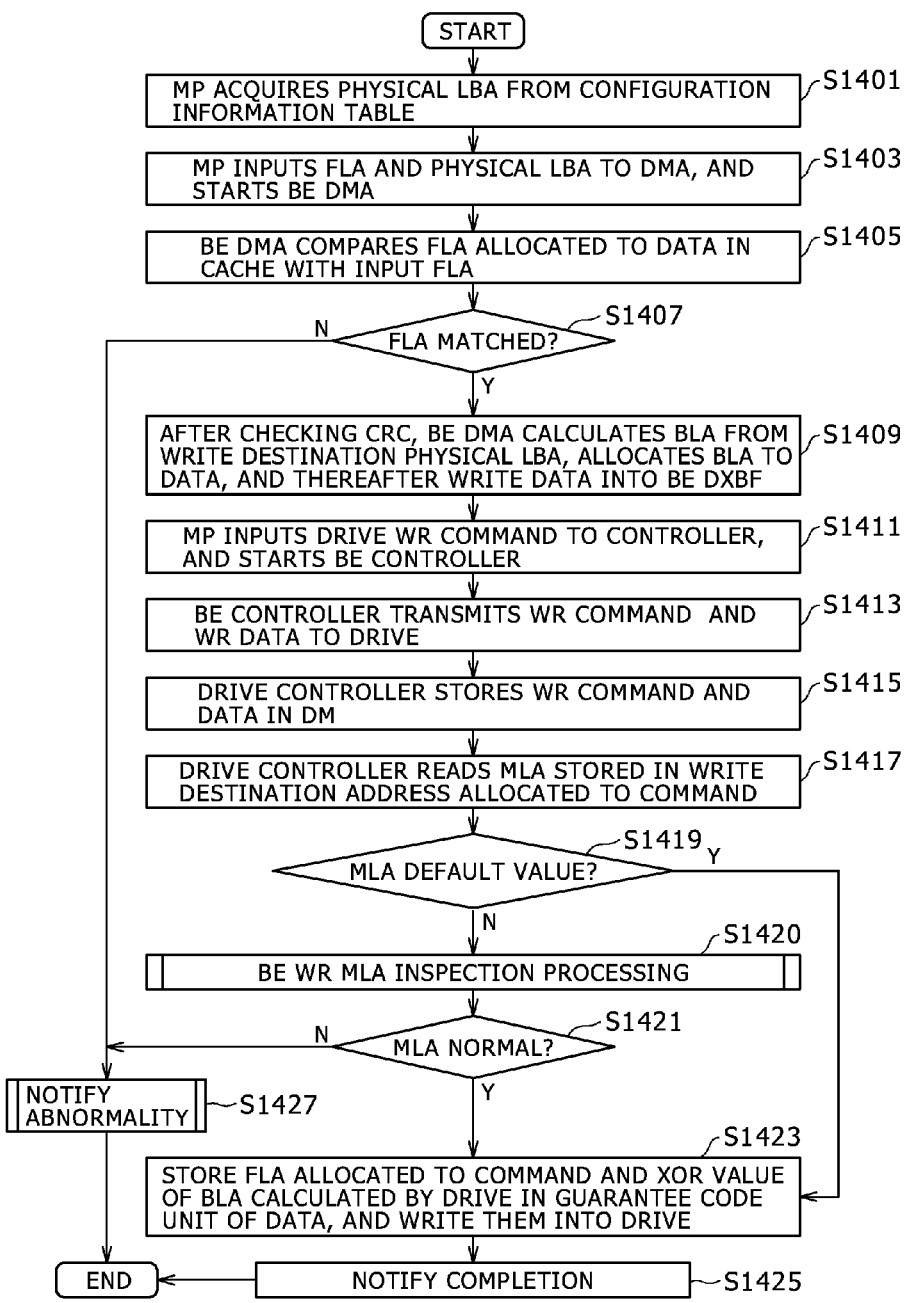
FIG. 14 is a flowchart illustrating back end write processing according to the first embodiment.

FIG. 14 is a flowchart of the back end write processing of the computer system 1 according to the first embodiment. The BEWR processing is processing for writing the write data on the CM 141 into the drive device 180. The BEWR processing may be conducted synchronously at the time of writing the write data from the host 10 into the CM 141, or may be conducted if the amount or rate of data unreflected on the drive device 180 in the CM 141 exceeds a given threshold value when a load of the MP 131 is low asynchronously with the write into the CM 141.

For example, a volume number which is an identifier of the LDEV to be accessed, and a host LBA (logical block address) are included in the write command transmitted from the host 10. The MP 131 obtains the corresponding physical LBA on the PG with reference to the configuration information table 1422 on the SM 142 according to the volume number and the host LBA (Step 1401).

The MP 131 inputs, to the BE DMA 153, the FLA calculated from the host LBA and the physical LBA obtained from the configuration information table 1422 on the SM 142 on the basis of the host LBA, and the BE DMA 153 transfers the write data from the CM 141 to the BE DXBF 154 (Step 1403). When transferring data, the BE DMA 153 compares the FLA input from the MP 131 with the FLA added to the write data to be transferred (Step 1405), and confirms whether those FLAB match each other, or not (Step 1407). If those FLAB do not match each other (N in Step 1407), the BE DMA 153 notifies the management server 20 of abnormality (Step 1427), and conducts abnormality end processing which will be described with reference to FIG. 24. Because it is understood that data having the LDEV LBA not to be written into the drive device is tried to be transferred due to the processing of comparing the FLA input from the MP 131 with the FLA added to the write data to be transferred for confirmation, data corruption written into the erroneous drive device can be prevented. As a cause of changing a write target, it is conceivable that the LDEV LBA or the cache memory address is rewritten to an unintentional value due to defective software at the time of updating the cache management table 1421 so that address conversion from the LDEV LBA into the cache memory address is in error.

If the FLA added to data matches the FLA input from the MP 131 (Y in Step 1407), the BE DMA 153 the BE DMA 153 calculates the BLA on the basis of the physical LBA input from the MP 131, adds the calculated BLA to data, conducts CRC check, and transfers data added with the BLA to the BE DXBF 154 (Step 1409).

Figure 15:
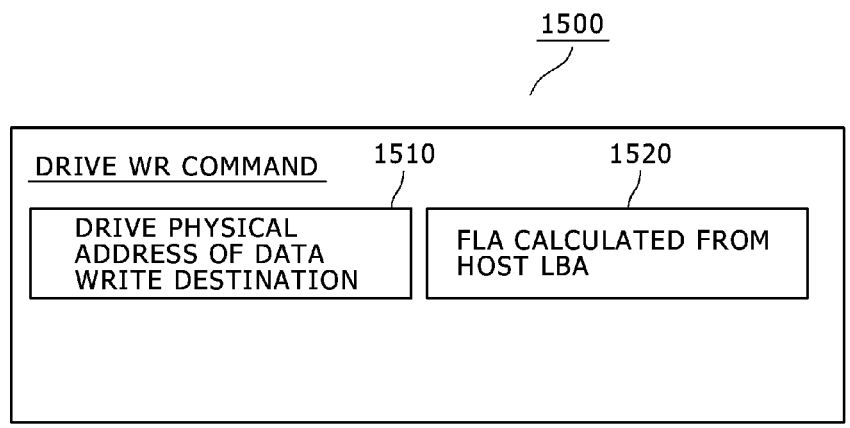
FIG. 15 is a diagram illustrating a structure of a drive write command according to the first embodiment.

FIG. 15 illustrates a structure of a drive write command 1500 in the computer system 1 according to the first embodiment. The drive write command 1500 includes, for example, a physical address 1510 having an identifier of the drive device 180 which is a data write destination, and a physical LBA, and an FLA 1520 obtained by the physical address 1510 which is the data write destination, and the corresponding LDEV LBA. In Step 1409, the FLA may be added to data instead of the calculated BLA, and the BLA calculated instead of the FLA 1520 may be included in the drive write command 1500. Also, the logical address may be included instead of the FLA 1520, and the FLA calculated instead of the FLA 1520 may be included in the drive write command 1500. Also, the logical address may be included instead of the FLA 1520, and the FLA may be recalculated on the basis of the logical address at the time of calculating the MLA.

Again returning to the description with reference to FIG. 14, the MP 131 inputs the drive write command 1500 to the BE controller 152, and starts the BE controller 152 (Step 1411). The BE controller 152 transmits the drive write command 1500 and the write data in the BE DXBF 154 to the drive device 180 according to an instruction from the MP 131 (Step 1413). Then, the drive controller 181 reads the MLA added to the data referred to in the physical LBA stored in the received drive write command (Step 1417). If the MLA is not a default value (N in Step 1419), the DMP 185 in the drive device 180 conducts all steps of MLA inspection processing illustrated in FIGS. 16 and 17, and conducts the MLA inspection (Step 1420). If the MLA is the default value (Y in Step 1419), or the result of the MLA inspection is normal (Y in Step 1421), the DMP in the drive device 180 adds the XOR value of the FLA stored in the drive write command and the BLA calculated from the physical LBA stored in the drive write command to the data, and writes data in the storage device 182 in the drive device 180. After completion of the write, the drive device 180 notifies the DKC 190 of the completion, and terminates the processing. If the result of the MLA inspection is abnormal (N in Step 1421), the drive device 180 notifies the drive device 180 of the abnormality, and the DKC 190 notifies the management server 20 of the abnormality to terminate the processing.

Figure 16:
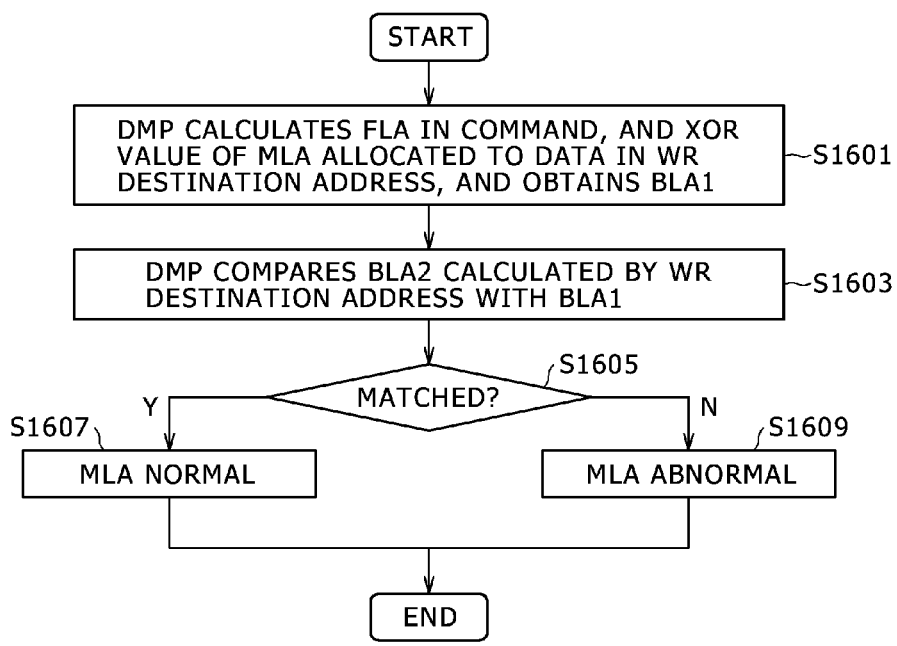
FIG. 16 is a flowchart illustrating write MLA inspection processing according to the first embodiment.

FIG. 16 is a flowchart illustrating the write MLA inspection processing in the computer system 1 according to the first embodiment. The write MLA inspection processing is executed when the drive device 180 receives the drive write command 1500 and the write data which are transmitted from the BEPK 150.

The drive controller 181 reads data stored in an area indicated by the physical LBA included in the drive write command 1500, and the DMP 185 calculates the XOR value (BLA1) of the MLA stored in the guarantee code portion 420 of the read data, and the FLA included in the drive write command 1500 (Step 1601). The DMP 185 compares the BLA (BLA2) obtained from the physical LBA included in the drive write command 1500 with the BLA1 (Step 1603), and confirms whether BLA1 matches the BLA2, or not (Step 1605). If the BLA1 matches the BLA2 (Y in Step 1605), the DMP 185 determines that the write designated by the drive write command 1500 is the write into a normal address (Step 1607). If values of the BLA1 and the BLA2 do not match each other (N in Step 1605), the DMP 185 determine that it is the write into an abnormal address, and notifies the management server 20 of the abnormality (Step 1609). It is confirmed whether the BLA1 and the BLA2 match each other, or not, thereby enabling data corruption caused by write in the abnormal address to be prevented. The comparison of the XOR value of the MLA and the FLA with the BLA may not be conducted. For example, a comparison of the XOR value of the BLA obtained from the physical LBA in the drive write command 1500 and the FLA added to the drive write command 1500 with the MLA saved in the drive device may be conducted. Alternatively, a comparison of the XOR value of the MLA saved in the drive device and the BLA calculated from the physical LBA included in the drive write command 1500 with the FLA included in the drive write command 1500 may be conducted. The MLA inspection may be conducted by not the drive device illustrated in FIG. 2, but the DKC 190. In this case, a block indicate by the physical LBA included in the drive write command 1500 is read on the CM 141, and the MP 131 conducts the MLA inspection processing. In this example, the read destination does not need to be the CM 141, but may be the BE DXBF 154. Also, the MLA inspection processing does not need to be conducted by the MP 131, but may be conducted by the BE DMA 153 or the BE controller 152.

Figure 17:
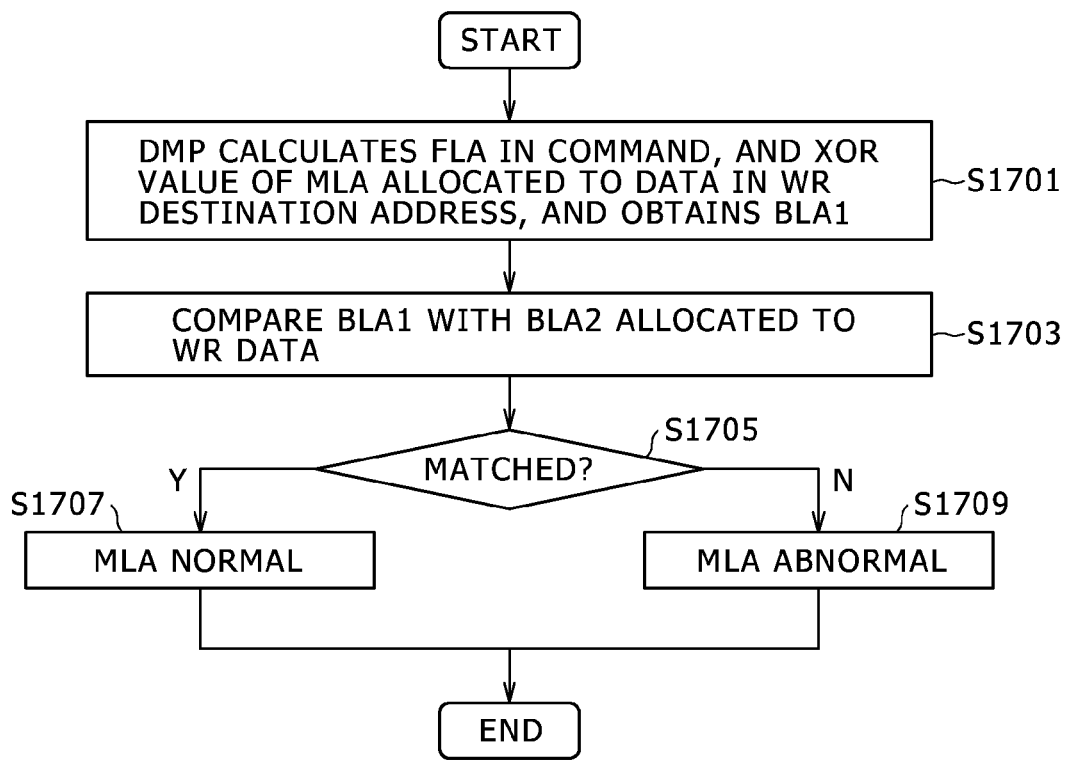
FIG. 17 is a flowchart illustrating write MLA inspection processing according to the first embodiment.

FIG. 17 is a flowchart illustrating the write MLA inspection processing in the computer system 1 according to the first embodiment. The write MLA inspection processing is executed when the drive device 180 receives the drive write command 1500 and the write data which are transmitted from the DKC 190.

The drive controller 181 reads data indicated by the physical LBA included in the drive write command 1500, and the DMP 185 obtains the XOR value (BLA1) of the MLA stored in a guarantee code portion of the read data, and the FLA included in the drive write command 1500 (Step 1701). Then, the DMP 185 compares the BLA1 with the BLA (BLA2) added to the write data (Step 1703). The DMP 185 confirms whether the BLA1 and the BLA2 match each other, or not (Step 1705), and determines that the write designated by the drive write command 1500 is the write in the normal address (Step 1707) if those two values match each other (Y in Step 1705). If the BLA1 and the BLA2 do not match each other (N in Step 1705), the DMP 185 determines the write is the write in the abnormal address, and notifies the management server of the write in the abnormal address (Step 1709). With this write MLA inspection processing, an address error caused by the address conversion error can be detected, the data corruption caused by the write in the abnormal address can be prevented. The address conversion error is generated by rewriting the LDEV LBA or the cache address to an incorrect value due to defective software, for example, at the time of updating the cache management table in FIG. 8.

The XOR value of the MLA and the FLA may not be compared with the BLA. For example, the XOR value of the BLA in the write data and the FLA added to the drive write command 1500 may be compared with the MLA saved in the drive device. Alternatively, the XOR value of the MLA saved in the drive device and the BLA added to the write data may be compared with the FLA included in the drive write command 1500.

The MLA inspection may be conducted by not the drive device 180 illustrated in FIG. 2, but the DKC 190. In this case, the MP 131 reads the block indicated by the physical LBA included in the drive write command 1500 on the CM 141, and conducts the MLA inspection processing. In this example, the read destination does not need to be the CM 141, but may be the BE DXBF 154. Also, the MLA inspection processing does not need to be conducted by the MP 131, but may be conducted by the BE DMA 153 or the BE controller 152. Also, the MLA inspection can be conducted by the drive controller 181 to reduce a load on the MLA inspection processing of the DKC 190, and an improvement in the I/O performance is expected. On the other hand, the MLA inspection can be conducted by the DKC 190 with the use of a commercial HDD or SSD having no drive controller 181 that conducts the inspection processing.

The MLA inspection processing can detect the write in the abnormal address by execution of at least any one of the processing illustrated in FIGS. 16 and 17. When both of the processing illustrated in FIGS. 16 and 17 are conducted, a detecting capability is improved, and the reliability is more improved. Also, in order to further improve the reliability, BLA processing which will be described later with reference to FIG. 18 may be conducted in addition to the processing of FIGS. 16 and 17.

Figure 18:
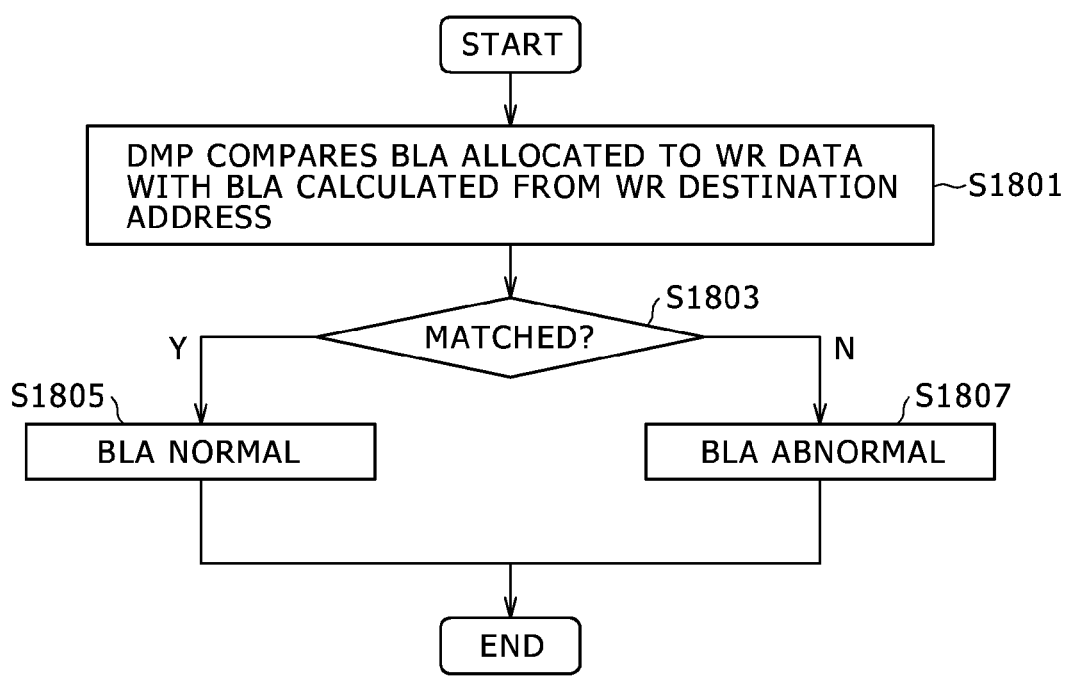
FIG. 18 is a flowchart illustrating write BLA inspection processing according to the first embodiment.

FIG. 18 is a flowchart illustrating the write BLA inspection processing in the computer system 1 according to the first embodiment. The write MLA inspection processing is executed when the drive device 180 receives the drive write command 1500 and the write data which are transmitted by the DKC 190.

The DMP 185 compares the BLA (BLA1) calculated from the physical LBA included in the drive write command 1500 with the BLA (BLA2) added to the write data (Step 1801). The DMP 185 confirms whether the BLA1 and the BLA2 match each other, or not (Step 1803), and if the BLA1 and the BLA2 match each other (Y in Step 1803), the DMP 185 determines that the physical LBA designated by the drive write command 1500 is normal (Step 1805). If the BLA1 and the BLA2 do not match each other (N in Step 1803), the DMP 185 determines that the data is written in the abnormal address (Step 1807).

As described above, the MLA inspection processing cannot be performed by only this processing, but for the purpose of improving the reliability, this processing may be added to the MLA inspection processing illustrated in FIGS. 16 and 17. The MLA inspection processing is to guarantee the results of the address conversion by a guarantee code calculated from the address before the address conversion is conducted, in addition to the guarantee of the write destination address by a related-art LA inspection processing. This MLA inspection processing must use the FLA calculated from the LDEV LBA which does not conduct the address conversion for the inspection. For that reason, any processing of FIGS. 16 and 17 is essential. The processing of FIG. 18 is not essential because the results of the address conversion are not guaranteed. However, for the purpose of guaranteeing the physical LBA of the write destination, the processing of FIG. 18 is additionally conducted to expect an improvement in the reliability.

After passing the MLA inspection, the XOR value of the FLA added to the drive write command 1500 and the BLA is stored in the LA area of the write data, and written into the storage device 182 of the drive device 180 (Step 1419 in FIG. 14). After completion of the write, the processing completion is notified the DKC 190 of, and the back end write processing is completed.

Figure 19:
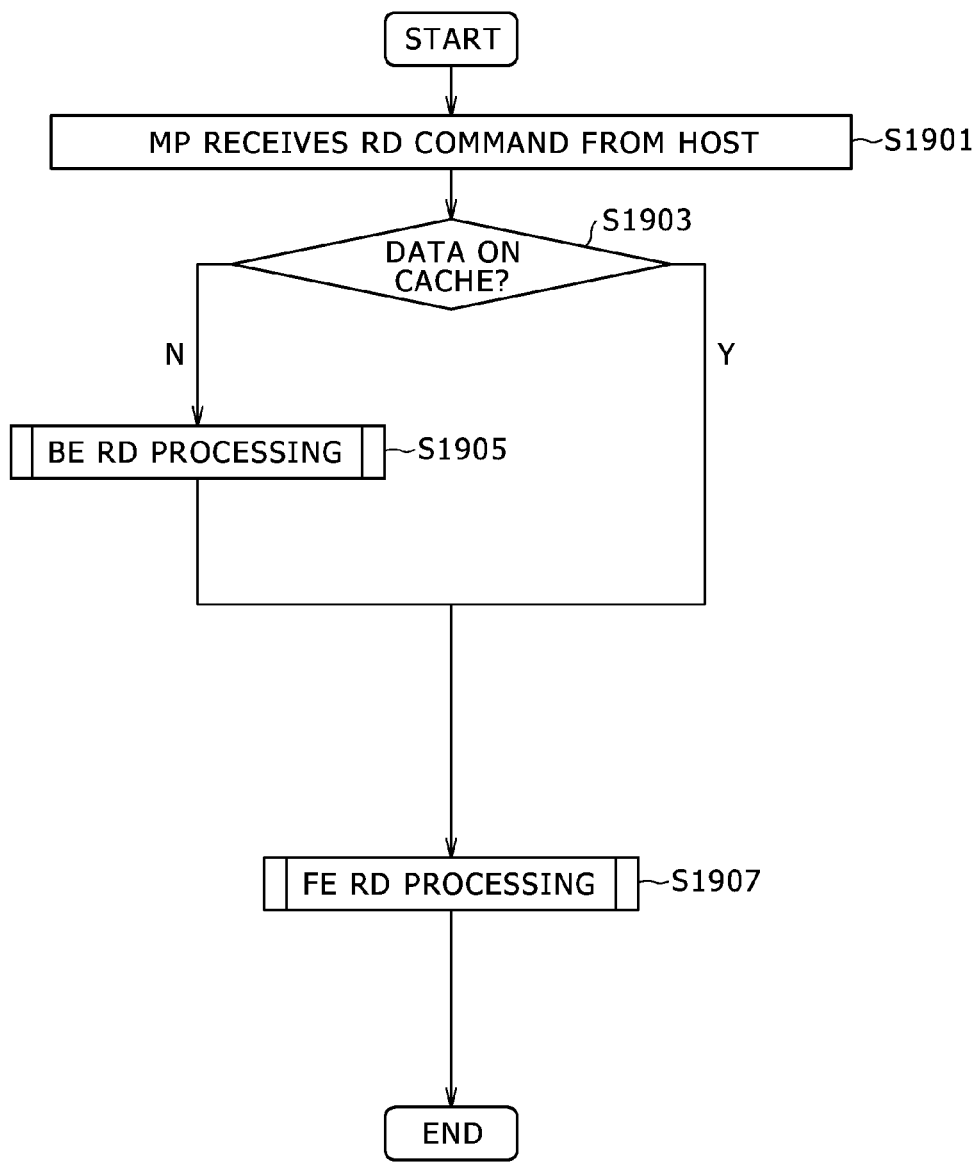
FIG. 19 is a flowchart illustrating host read processing according to the first embodiment.

FIG. 19 is a flowchart illustrating host read processing in the computer system 1 according to the first embodiment. The host read processing is executed when the MP 131 receives a read command from the host 10 through the ports 111 of the FEPK 110 (Step 1901).

For example, a volume number which is an identifier of the LDEV to be accessed, and the host LBA are included in the read command from the host 10. The address on the CM 141 is obtained from the volume number and the host LBA with reference to the cache management table 1421 on the shared memory. The MP 131 confirms whether data designated by the read command is present on the CM 141, or not (Step 1903). If no data is present on the CM 141 (N in Step 1903), the MP 131 conducts the back end read processing which is the processing of writing data read from the drive device 180 into the CM 141 (Step 2005, hereinafter called "BERD processing"). The details of the BERD processing will be described with reference to FIG. 21. If data is present on the CM 141 (Y in Step 1903), or the BERD processing is completed, the MP 131 conducts the front end read processing (Step 1907, hereinafter called "FERD processing") for transmitting data in the CM 141 to the host 10. The details of the FERD processing will be described with reference to FIG. 20.

Figure 20:
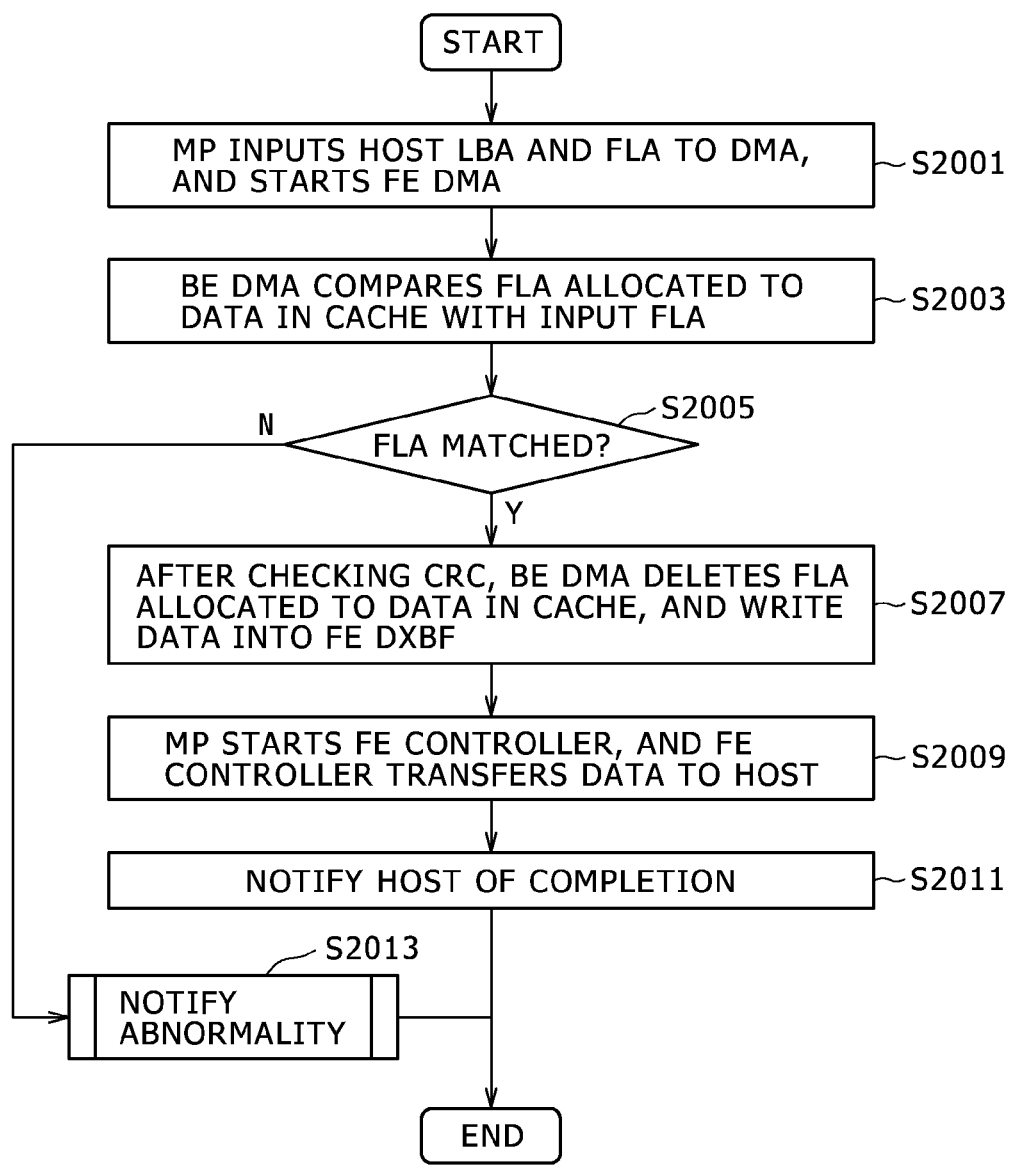
FIG. 20 is a flowchart illustrating front end read processing according to the first embodiment.

FIG. 20 is a flowchart illustrating the front end read processing in the computer system 1 according to the first embodiment. The MP 131 receives the host LBA in the read command, and the FLA calculated from the host LBA, and starts the FE DMA 113 (Step 2001). The FE DMA 113 compares the input FLA with the FLA added to the read data for the read data on the CM 141 corresponding to the host read command (Step 2003). The FE DMA 113 confirms whether the input FLA and the FLA added to the read data match each other, or not (Step 2005). If the input FLA matches the FLA added to the read data (Y in Step 2005), the FE DMA 113 deletes the FLA of the read data. Then, the FE DMA 113 transfers the read data to the FE DXBF 114 after conducting a CRC check (Step 2007). The CRC check and the FLA deletion are in random order. On the other hand, if the input FLA does not match the FLA added to the read data (N in Step 2005), the FE DMA 113 determines that data is written in the abnormal address (Step 2013). With this FLA inspection, the FE DMA 113 can detect that the data is written in the abnormal address, and abnormal data can be prevented from being transferred to the host 10. As a result, the reliability of the storage device 100 can be improved.

After the data has been transferred to the FE DXBF 114, the MP 131 starts the FE controller 112, and the FE controller 112 transmits the read data to the host 10 through the ports 110 of the FEPK 110 (Step 2009). After the read data has been transmitted to the host 10, the MP 131 transmits the completion notification to the host 10, and terminates the FERD processing (Step 2011).

Figure 21:
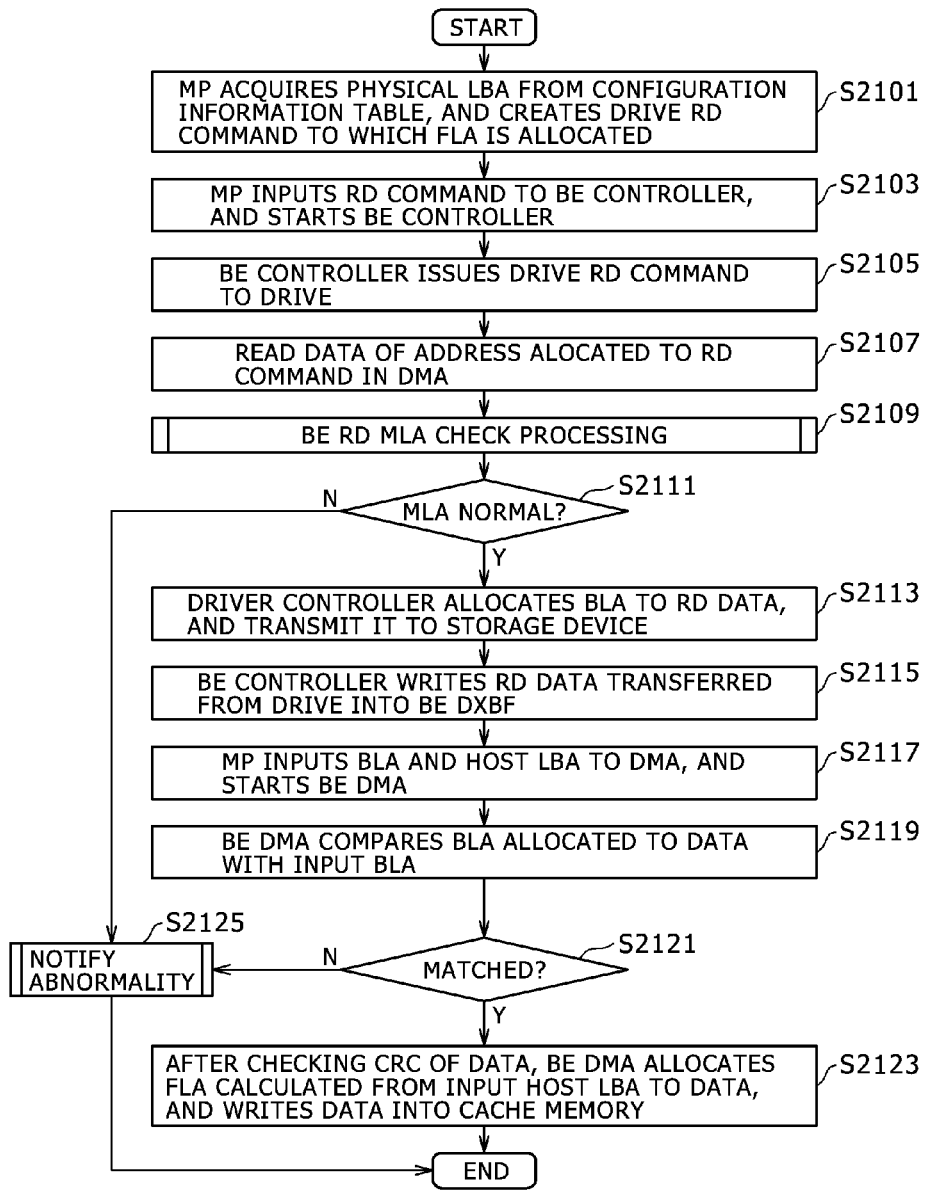
FIG. 21 is a flowchart illustrating back end read processing according to the first embodiment.

FIG. 21 is a flowchart illustrating the back end read processing in the computer system 1 according to the first embodiment. The BERD processing is processing when reading the read data on the CM 141 from the drive device 180 if no read data is present on the CM 141.

Figure 22:
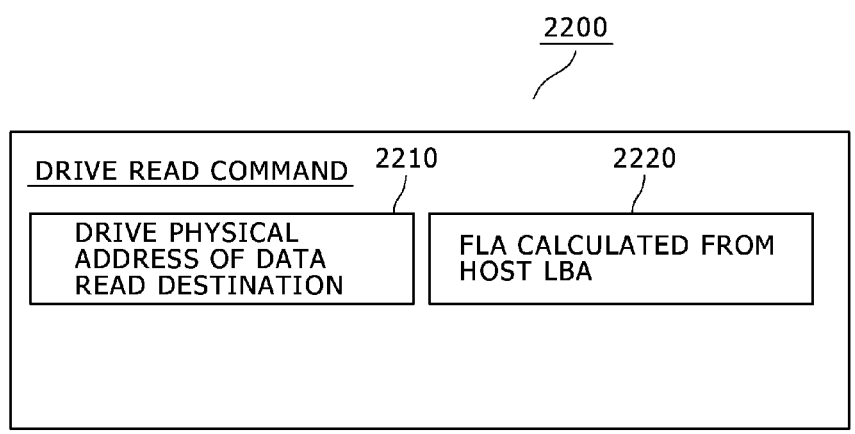
FIG. 22 is a diagram illustrating a structure of a drive read command according to the first embodiment.

FIG. 22 illustrates a structure of a drive read command 2200 in the computer system 1 according to the first embodiment. A drive read command includes a physical address 2210 having an identifier of the drive device 180 to be accessed, and the physical LBA, and an FLA 2220 obtained from the corresponding host LBA.

Again returning to FIG. 21, the MP 131 acquires the physical LBA from the configuration information table 1422, calculates the FLA from the host LBA, and creates the drive read command 2200 added with the FLA (Step 2201). The MP 131 inputs the drive read command 2200 to the BE controller 152, and starts the BE controller 152 (Step 2103). The BE controller 152 transmits the drive read command 2200 to the drive device 180 according to an instruction from the MP 131 (Step 2105). Upon receiving the drive read command 2200, the drive controller 181 conducts read MLA inspection processing (Step 2109).

Figure 23:
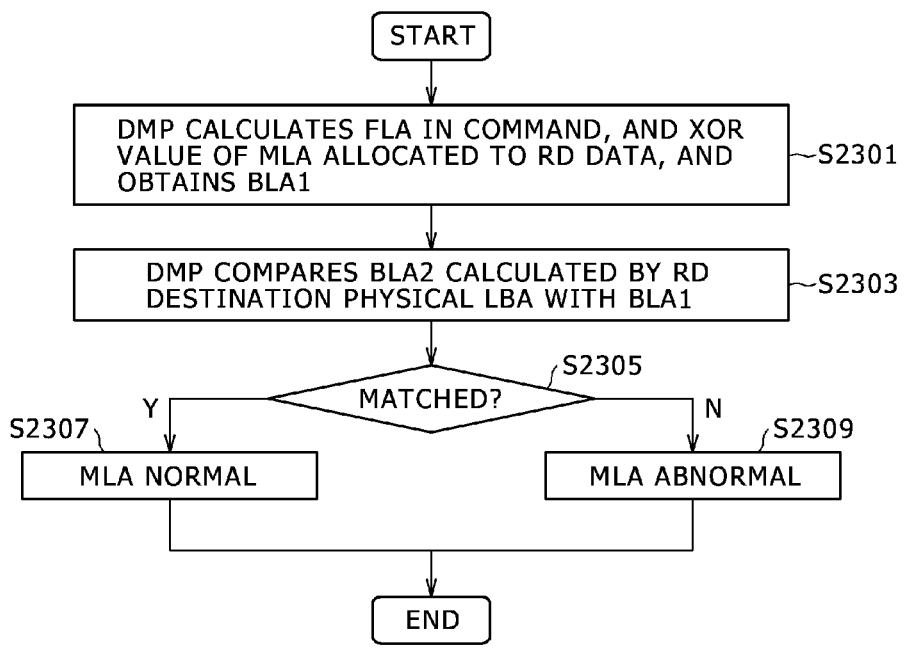
FIG. 23 is a flowchart illustrating read MLA inspection processing according to the first embodiment.

FIG. 23 is a flowchart illustrating read MLA inspection processing in the computer system 1 according to the first embodiment. The read MLA inspection processing is executed when the drive device 180 receives the drive read command 2200 transmitted from the DKC 190.

The drive controller 181 reads data indicated by the physical LBA included in the drive read command, and the DMP 185 calculates the XOR value (BLA1) of the MLA stored in the guarantee code portion of the read data, and the FLA included in the drive read command 2200 (Step 2301). The DMP 185 compares the calculated XOR value with the BLA (BLA2) calculated from the physical LBA included in the drive read command (Step 2303). The DMP 185 confirms whether the values of the BLA1 and the BLA2 match each other, or not (Step 2305). If the values of the BLA1 and the BLA2 match each other (Y in Step 2305), the DMP 185 determines that the read designated by the drive read command 2200 is the read from the normal address (Step 2307). If the BLA1 and the BLA2 do not match each other (N in Step 2305), the DMP 185 determines that the read is the read from the abnormal address (Step 2309). The read MLA inspection processing can detect the read from the abnormal address, and prevent the read from the abnormal address.

In this example, as with the back end write processing, the storage device 100 may conduct the MLA inspection processing.

Again returning to FIG. 21, the drive controller 181 confirms whether the data has passed the read MLA inspection processing, or not (Step 2111). If the data has passed the MLA inspection (Y in Step 2111), the drive controller 181 adds the BLA calculated from the physical LBA included in the drive read command 2200 in the read data to the data, and transfers the data to the DKC 190 (Step 2113). After the BE controller 152 has stored the read data transferred from the drive device 180 into the BE DXBF 154 (Step 2115), the MP 131 inputs the BLA calculated from the physical LBA to be read, and the host LBA obtained from the configuration information table on the shared memory to the BE DMA 153, and starts the BE DMA 153 (Step 2117).

When transferring the read data from the BE DXBF 154 to the CM 141, the BE DMA 153 compares the BLA added to the read data in the BE DXBF 154 with the BLA input from the MP 131 (Step 2119). The BE DMA 153 confirms whether the BLA added to the read data matches the BLA input from the MP 131, or not (Step 2121). If the BLA added to the read data matches the BLA input from the MP 131 (Y in Step 2121), the BE DMA 153 adds the FLA calculated according to the host LBA input from the MP 131 to the read data in the BE DXBF 154, and conducts the CRC check. Thereafter, the BE DMA 153 writes the data into the CM 141 (Step 2123), and terminates the back end read processing. In this example, the CRC check and the FLA addition are in random order. Also, If the BLA added to the read data does not match the BLA input from the MP 131 (N in Step 2121), the BE DMA 153 notifies the management server of the abnormality (Step 2125), and conducts the abnormality end processing described with reference to FIG. 24.

Figure 24:
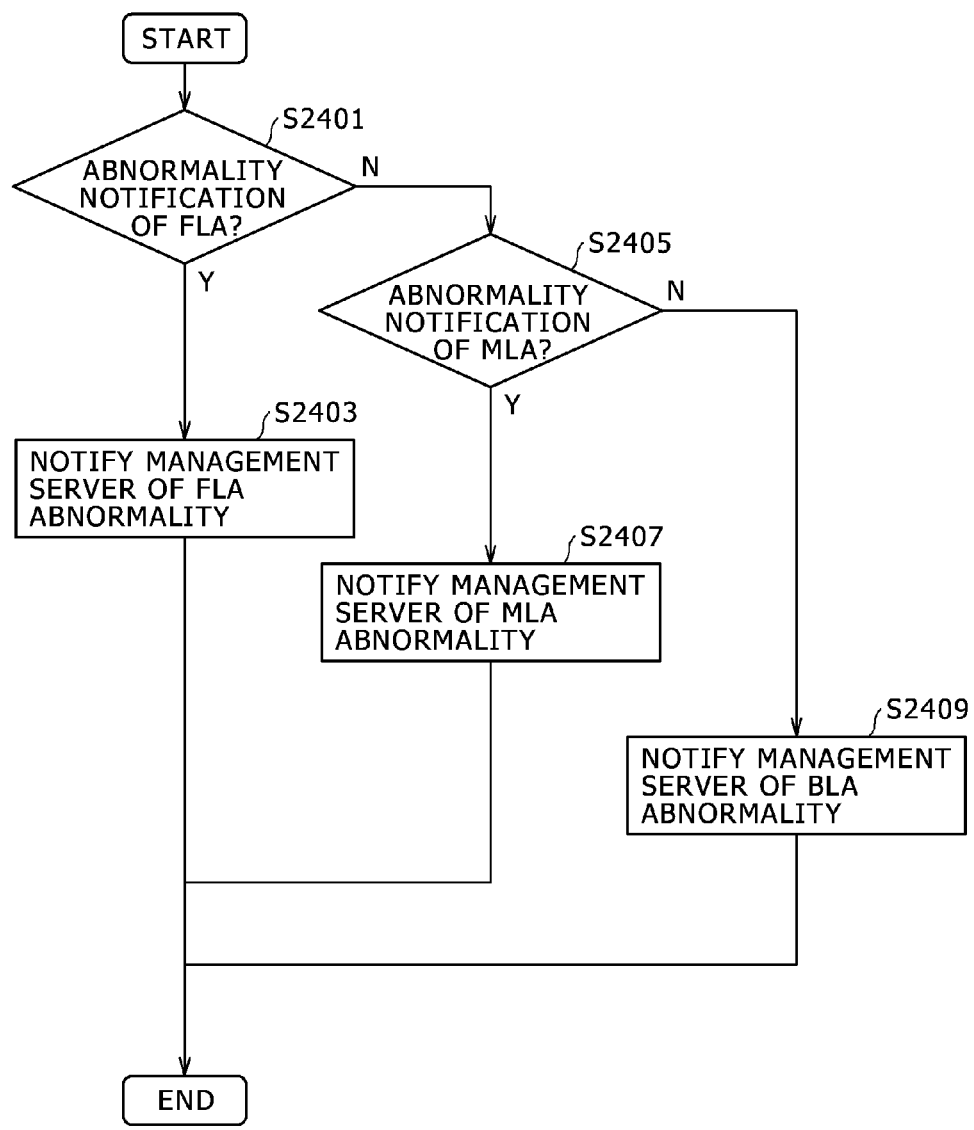
FIG. 24 is a flowchart illustrating abnormality end processing according to the first embodiment.

FIG. 24 is a flowchart illustrating the processing in the case of the LA mismatching in the computer system 1 according to the first embodiment. At the time of the LA mismatching, the storage device 100 notifies a manager that the LA mismatching is detected through the management I/F 120. When the BE DMA 153 transfers data from the CM 141 to the FE DXBF 114, or when the FE DMA 113 transfers data from the CM 141 to the FE DXBF 114, the MP 131 checks whether the FLA added to the data matches the FLA input from the MP 131, or not. If the FLA added to the data does not match the FLA input from the MP 131, the BE DMA 153 or the FE DMA 153 notifies the MP 131 of the FLA abnormality. The MP 131 that has received the FLA abnormality notification notifies the management server 20 of the FLA abnormality through the management I/F 120 (Y in Step 2401, Step 2403). When the MP 131 receives the MLA abnormality notification from the drive device 180, the MP 131 notifies the management server 20 of the BLA abnormality through the management I/F 120 (Y in Step 2405, Step 2407). When transmitting data from the BE DXBF 154 to the CM 141, or when transferring the data from the BE DXBF 154 to the drive device 180, the BE DMA 153 checks whether the BLA added to the data matches the BLA input from the MP 131, or not. If the BLA added to the data does not match the BLA input from the MP 131, the BE DMA 153 notifies the MP 131 of the BLA abnormality.

Second Embodiment

An outline of a computer system 1 including a storage system according to a second embodiment will be described. In the second embodiment, the same hardware configuration as that in the first embodiment is used, and the shared processing is executed. Therefore, only differences from the first embodiment will be described, and the same parts will be omitted from the description.

Figure 25:
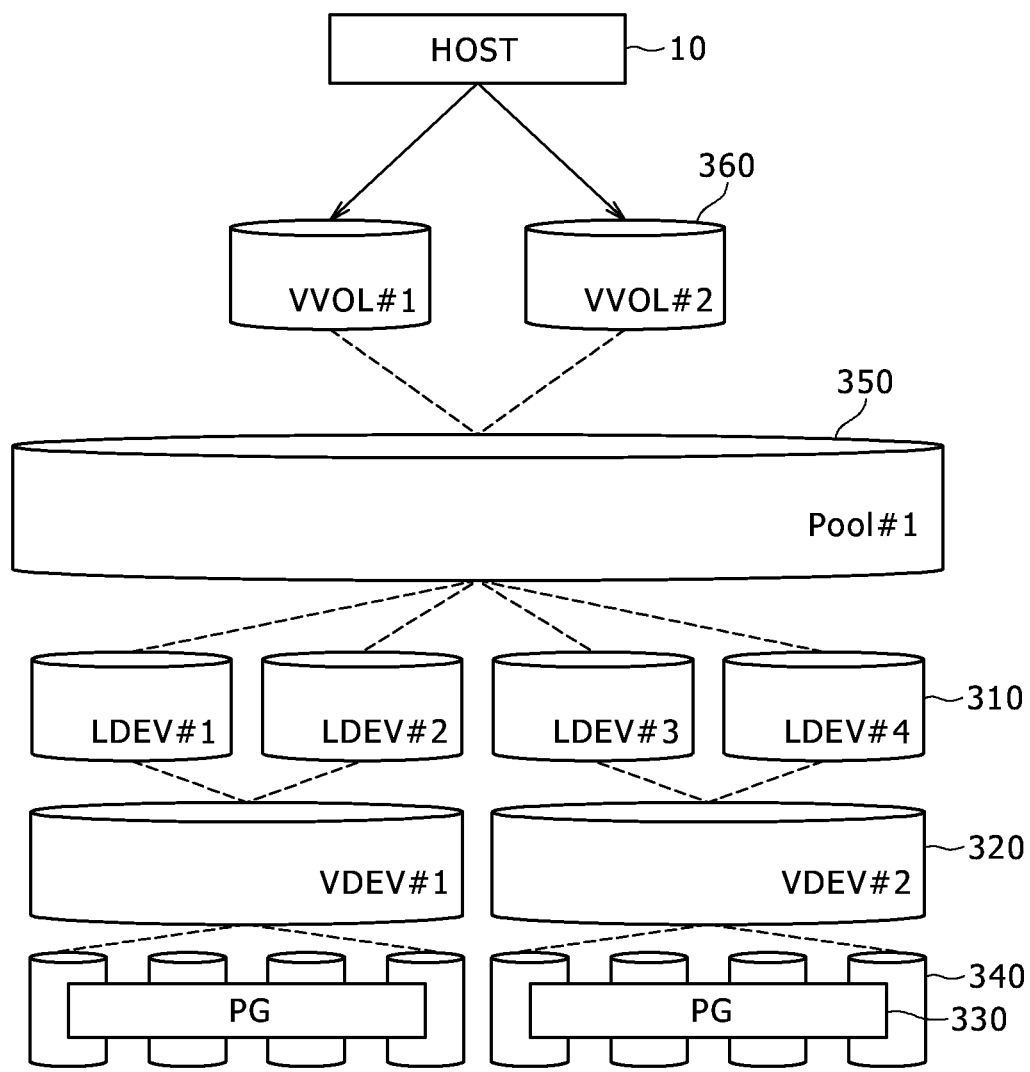
FIG. 25 is a diagram illustrating a logical configuration according to a second embodiment.

FIG. 25 is a diagram illustrating a logical system configuration of the computer system 1 according to the second embodiment. The storage device 100 bundles a plurality of LDEVs 310 to configure a pool 350 which is an assembly of the logical storage capacities. A plurality of virtual volumes (VVOL) 360 is present within the pool 350. The VVOL 360 is referred to from the storage device 100 by a virtual device. A manager of the storage device 100 creates the VVOL 360 of an arbitrary size through the maintenance I/F 120. This size does not depend on a total capacity of the real drives. The MP 131 dynamically allocates each storage area (LDEV block) of the LDEV 310 to virtual storage areas (VVOL block) of the VVOL 360 to be I/O accessed from the host 10. After the allocation, a correspondence of the VVOL LBA and the LDEV LBA is stored in an address mapping table 1423 on the shared memory 142.

Figure 26:
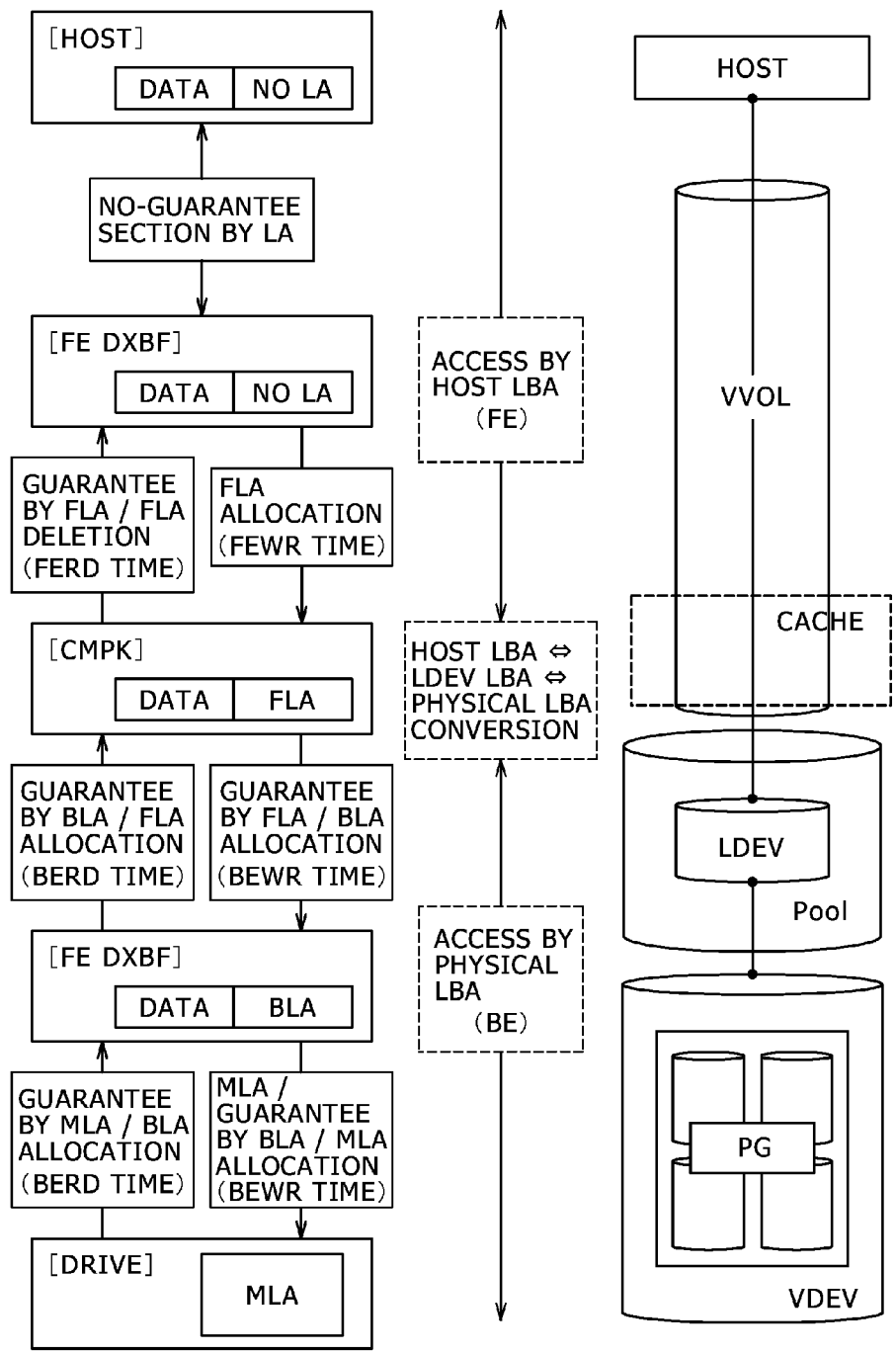
FIG. 26 is a diagram illustrating a correspondence between a data guarantee range by an LA and a logical system configuration according to the second embodiment.

FIG. 26 is a diagram illustrating a correspondence between a data guarantee range by the LA and a logical system configuration in the computer system 1 according to the second embodiment. In data transfer within the storage device 100, a guarantee code (hereinafter called "MLA") obtained by synthesizing a guarantee code (hereinafter referred to as "FLA") calculated from a logical address of the logical volume (VVOL) which is referred to by the host 10, and a guarantee code (hereinafter called "BLA") calculated from the physical address of the drive device, is added to data, resulting in such an advantage that an I/O of an abnormal address is detected to prevent data corruption or read of erroneous data.

When the host 10 reads data from the storage device 100, if intended data is present within the drive device 180, the data is transferred from the drive device 180 to the BE DXBF 154. Thereafter, the data is transferred from the BE DXBF 154 to the CM 141, from the CM 141 to the FE DXBF 114, and thereafter transferred to the host 10 through the ports 111. The MP 131 converts the host LBA (VVOL LBA) used for an access to data by the host 10 into the LDEV LBA with the use of an address mapping table 1423 on the SM 142, and converts the LDEV LBA obtained by the conversion into the physical LBA with the use of the configuration information table 1421. The MP 131 uses the physical LBA for an access to data within the physical drive device 180. The data within the drive device 180 is protected by the MLA. When transferring data from the drive device 180 to the BE DXBF 154, the DMP 185 in the drive device 180 confirms that the MLA is normal, with the use of the physical LBA, and FLA which are stored in the drive read command 1500 issued to the drive device 180 by the DKC 190, and changes the guarantee code from the MLA to the BLA. When the BE DMA 153 transfers data from the BE DXBF 154 to the CM 141, the BE DMA 153 confirms that the BLA is normal, and adds the FLA calculated from the MP 131 with the use of the VVOL LBA to the data. After the data has been stored in the CM 141, the MP 131 updates the cache management table on the SM 142 (hereinafter, the above thin-provisioning end read processing is called "thin-pro BERD processing"). When the FE DMA 113 transfers the data on the CM 141 to the FE DXBF 114, the FE DMA 113 confirms that the FLA is normal, and excludes the FLA. The data transferred to the FE DXBF 114 is transferred to the host 10 by the FE controller 112 (hereinafter, the above thin-provisioning band front end read processing is called "thin-pro FERD processing"). When intended data is on the CM 141, only the FERD processing is conducted.

When the host 10 writes data into the storage device 100, write data transferred from the host 10 is received by the FE DXBF 114, and transferred to the CM 141 by the FE DMA 113. When transferring data to the CM 141, the MP 131 inputs the FLA calculated by the host LBA (VVOL LBA) to the FE DMA 113, and the FE DMA 113 adds the FLA to the data. Thereafter, the FE DMA 113 transfers the data from the FE DXBF 114 to the CM 141. After storing the data in the CM 141, the MP 131 updates the cache management table (hereinafter, the above thin-provisioning front end write processing is called "thin-pro FEWR processing"). When writing the data into the drive device 180 from the CM 141 through the BE DXBF 154, the MP 131 converts the host LBA into the LDEV LBA with the use of the address mapping table 1423 on the SM 142, and converts the LDEV LBA obtained by the conversion into the physical LBA with the use of the configuration information table 1421. When transferring the data from the CM 141 to the BE DXBF 154, the BE DMA 153 confirms that the FLA is normal, and then adds the BLA input from the MP 131 to the data. The data transferred from the BE DXBF 154 to the drive device 180 is temporarily retained in the DM 184. The DMP 185 confirms that the MLA stored in the write destination physical LBA is normal according to the BLA added to the data, the FLA added to a drive write command issued to the drive device 180 by the DKC 190, and the write destination physical LBA in the drive write command 1500, and thereafter the DMP 185 adds the MLA to the data, and writes the data (hereinafter, the above thin-provisioning back end write processing is called "thin-pro BEWR processing").

Figure 27:
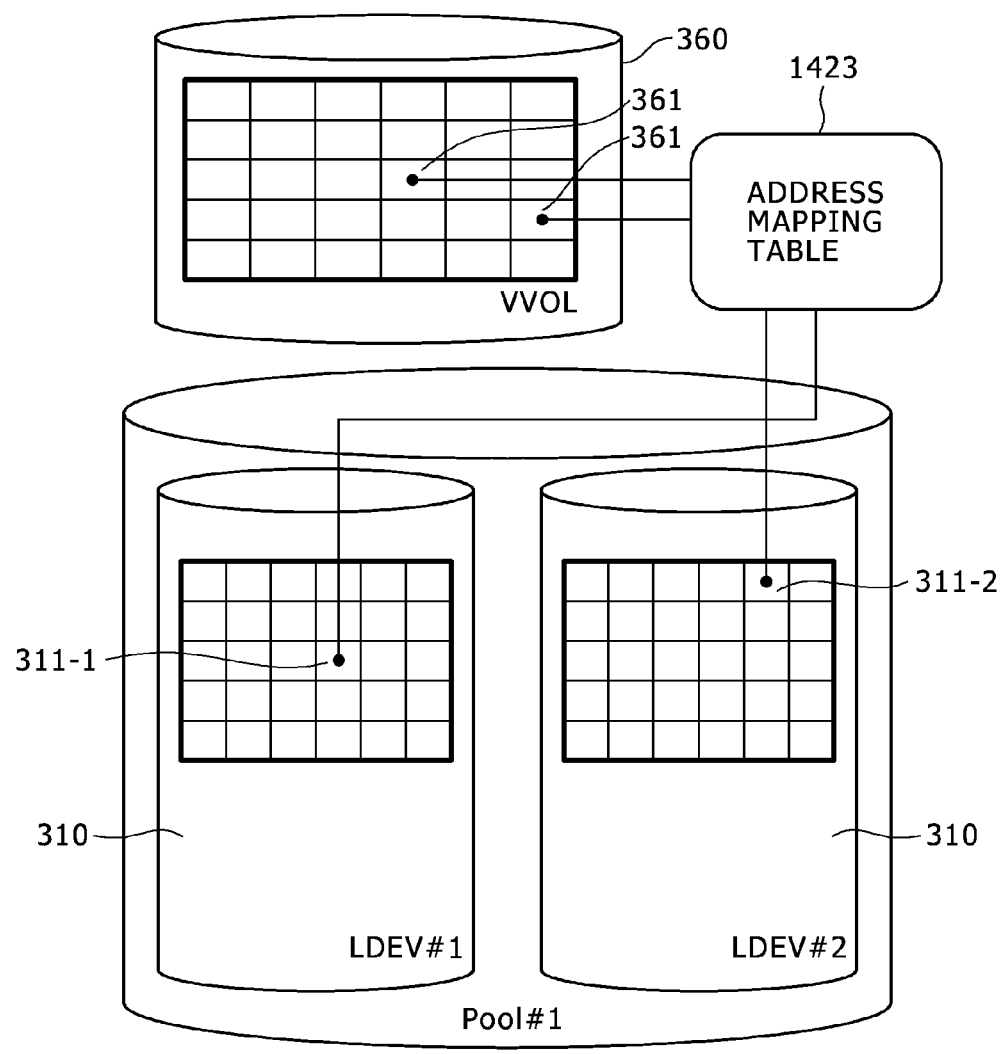
FIG. 27 is a diagram illustrating a data mapping structure according to the second embodiment.

FIG. 27 is a diagram illustrating a data mapping structure in the computer system 1 according to the second embodiment.

The VVOL 360 that can be recognized by the host 10 is configured by a plurality of VVOL blocks 361. An LDEV 310-1, and an LDEV block 311-1 and an LDEV block 311-2 of an LDEV 310-2 are allocated to the VVOL blocks 361. This relationship is called "page mapping", and the MP 131 dynamically manages the relationship by the address mapping table 1423 on the SM 142. The VVOL 360 has a unique number (VVOL#) which is an identifier for identifying each VVOL 360 in the storage device 100.

FIG. 28 is a diagram illustrating the address mapping table 1423 that manages the address mapping in the computer system 1 according to the second embodiment. In the second embodiment, the host 10 uses VVOL LBA for an access to the data. The address mapping management table is information indicative of a correspondence relationship of Pool#14231, VVOL#14232, VVOL LBA 14233, LDEV#14234, and LDEV LBA 14235. With this table, the MP 131 can investigate which LDEV LBA a block corresponding to the VVOL LBA used for an access by the host 10 corresponds to.

FIG. 29 is a diagram illustrating an LDEV free block management table 1424 that manages the LDEV allocation block in the computer system 1 according to the second embodiment. The LDEV free block management table 1424 includes a row 14241 that stores Pool# therein, a row 14242 that stores LDEV# therein, a row 14243 that stores LDEV LBA therein, and a row 14244 that stores an allocation flag indicative of whether the block identified by the LDEV LBA is allocated to the VVOL block, or not, therein, which are stored in the SM 142. For example, a flag indicating that the block has already been allocated to the VVOL is set in the LDEV LBA1 of the LDEV#1 configuring the Pool#0. When the block is not allocated to the VVOL, "not-allocated" indicating that the block is not allocated is stored as in the LDEV LBA3 of the LDEV#1 configuring the Pool#0.

The LDEV allocation block management table is information indicative of a correspondence relationship of Pool#, LDEV#, LDEV LBA, and whether in use, or not. With this table, the MP 131 can investigate an allocatable LDEV block when allocating the LDEV block to the VVOL.

The host write processing of the computer system 1 according to the second embodiment includes FEWR processing (called "thin-pro FEWR processing" in the second embodiment), and BEWR processing (called "thin-pro BEWR processing" in the second embodiment) as in the computer system 1 of the first embodiment. Hereinafter, only differences from the first embodiment will be described.

Figure 30:
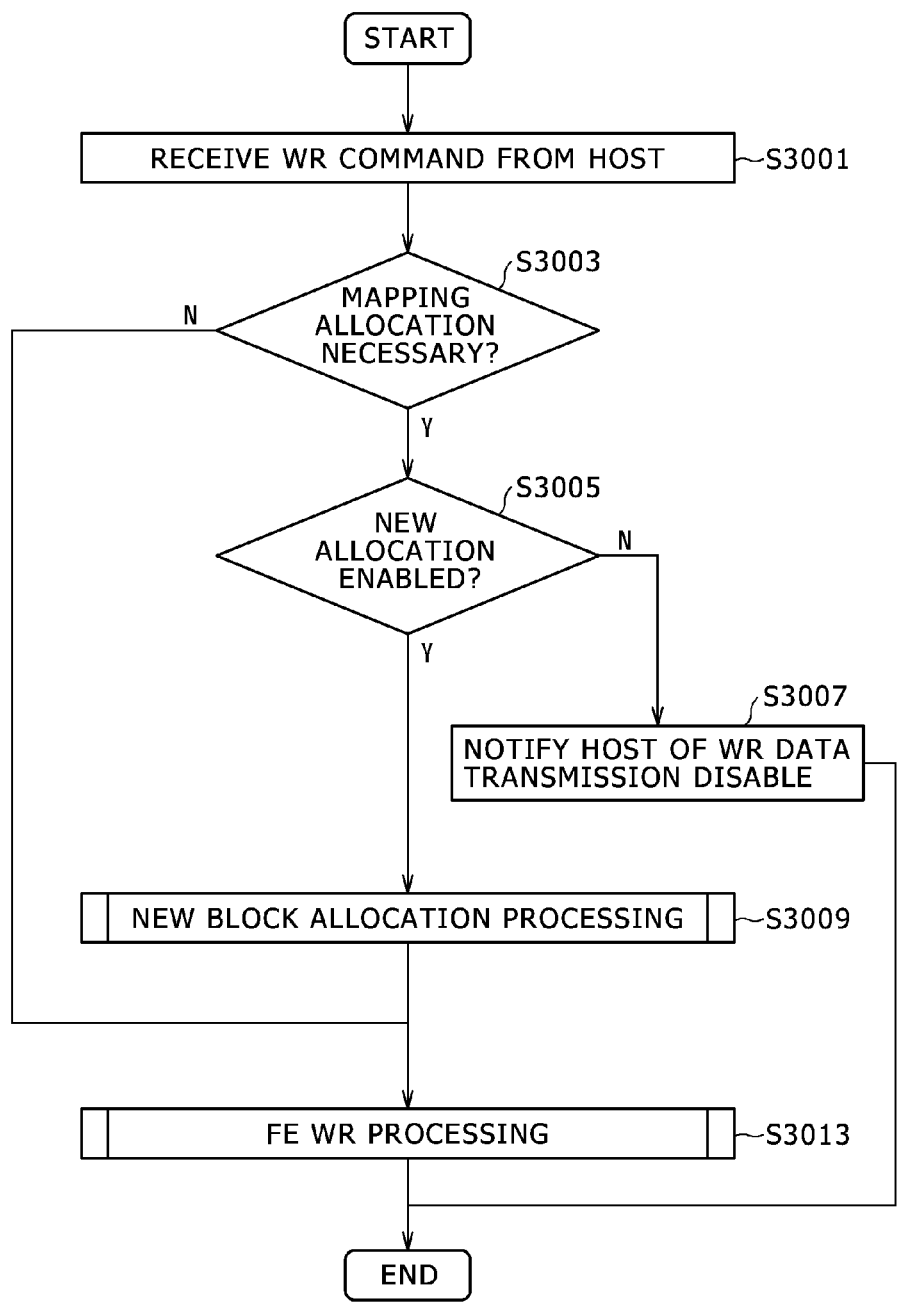
FIG. 30 is a flowchart illustrating front end write processing according to the second embodiment.

FIG. 30 is a flowchart illustrating FEWR processing (thin-pro FEWR processing) in the computer system 1 according to the second embodiment. The FEWR processing is executed when the storage device 100 receives the host write command from the host 10.

When the MP 131 receives the host write command from the host 10 (Step 3001), the MP 131 determines whether the LDEV block is allocated to the VVOL block to be written which is indicated by the host LBA within the host write command, or not, with reference to the LDEV free block management table 1424 on the SM 142 (Step 3003). If the LDEV block is allocated to the VVOL block (N in Step 3003), the FEWR processing in FIG. 13 according to the first embodiment is conducted (Step 3013).

Figure 31:
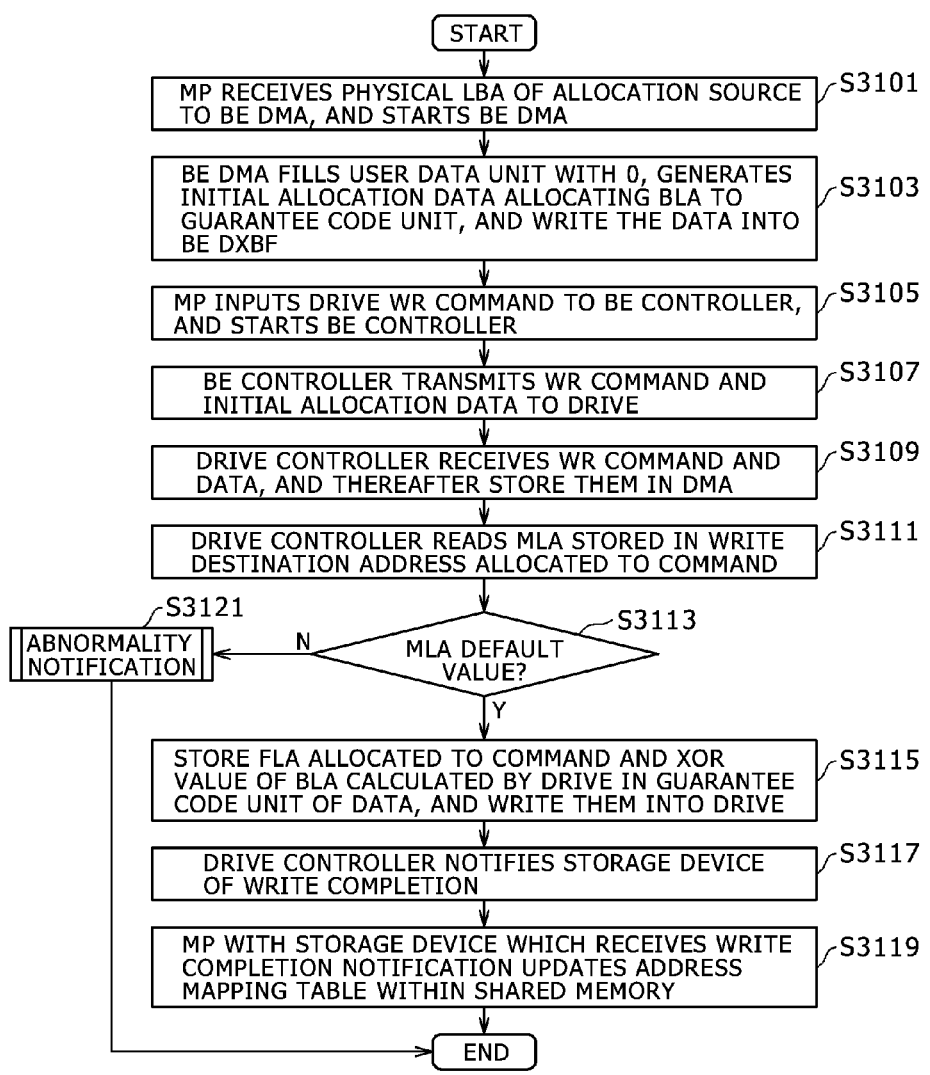
FIG. 31 is a flowchart illustrating VVOL block allocation processing according to the second embodiment.

If the allocation is necessary (Y in Step 3003), the MP 131 determines whether the LDVE block which is to be allocated, that is, which is not allocated to any VDED block, is present, or not (Step 3005). If the allocable LDEV block is present (Y in Step 3005), the allocation processing which will be described with reference to FIG. 31 is conducted (Step 3009), and thereafter the FEWR processing is conducted (Step 3013). If the allocable LDEV block is not present (N in Step 3005), the storage device 100 notifies the host 10 that the write data transmission is disabled (Step 3013).

FIG. 31 is a flowchart illustrating the VVOL block allocation processing in the computer system 1 according to the second embodiment. The MP 131 refers to the LDEV free block management table 1424 on the SM 142, obtains the LDEV LBA of the allocatable LDEV block, and obtains the physical LBA from the obtained LDEV LBA and the configuration information table 1422. The MP 131 inputs the obtained physical LBA, and the VVOL LBA to which the physical LBA is allocated to the BE DMA 153, and starts the BE DMA 153 (Step 3101). The BE DMA 153 sets the overall area of the user data portion 410 in FIG. 4 to 0, creates default allocation data in which the XOR value (MLA) of the FLA calculated from the VVOL LBA, and the BLA calculated from the physical LBA is stored in the LA area 421 of the guarantee code portion 420, and writes the data into the BE DXBF 154 (Step 3103).

The MP 131 inputs the drive write command 1500 to the BE controller 152, starts the BE controller 152, and transmits the drive write command 1500 including the default allocation data written in the BE DXBF 154 and the FLA calculated from the VVOL LBA to the drive device 180 (Step 3107). The drive controller 181 stores the drive write command 1500 and the default allocation data in the drive memory 184 (Step 3109), reads the block indicated by the physical LBA of the write destination included in the drive write command 1500 (Step 3111), and confirms whether the MLA is the default value, or not (Step 3113). If the read MLA is the default value (Y in Step 3113), the MP 131 stores the XOR value of the FLA added to the command and the BLA calculated by the drive controller 181 in the LA area 421 in the guarantee code portion of the data, and writes the default allocation data into the storage device 182 (Step 3115). In this example, if the MLA is not the default value (N in Step 3113), it is found that the MLA has already been allocated to another VVOL LBA. For that reason, the OO notifies the OO of the abnormality (Step 3121), and if the MLA is not the default value, the MP 131 executes the abnormality end processing of FIG. 24. When the LDEV LBA is allocated to the VDEV LBA, it is confirmed whether the MLA is the default value, or not, thereby being capable of preventing the data corruption caused by allocation of another VVOL LBA to the allocated area (N in Step 3115).

When the write of the default allocation data has been completed, the drive device 180 notifies the DKC 190 of the write completion (Step 3117). The MP 131 in the storage device 100 that has received the write completion notification updates the address mapping table 1423 (Step 3119), and completes the VVOL block allocation processing.

Figure 32:
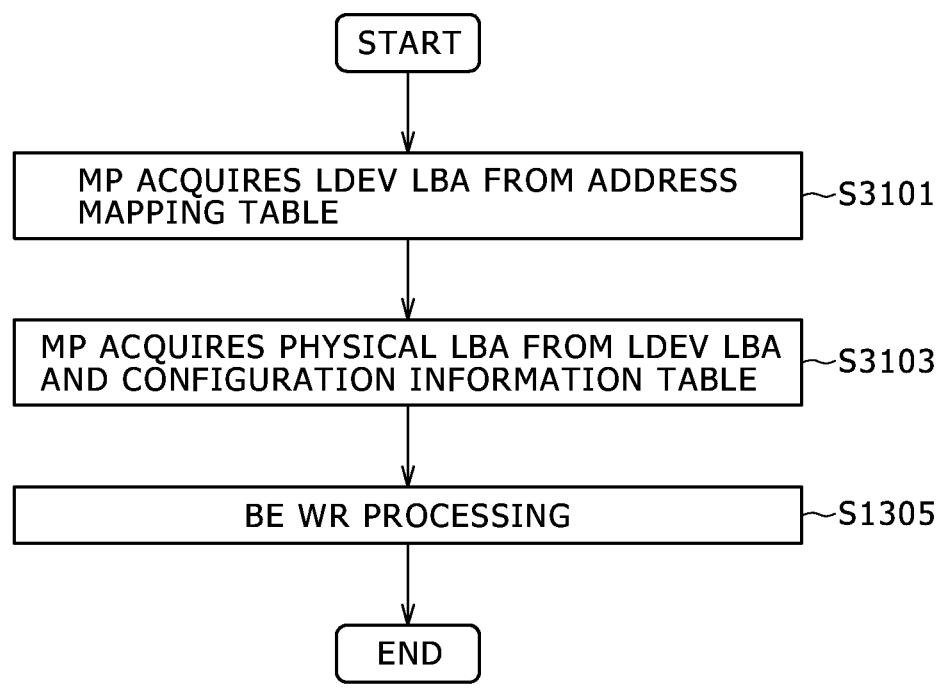
FIG. 32 is a flowchart illustrating back end write processing according to the second embodiment.

FIG. 32 is a flowchart illustrating BEWR processing (thin-pro BEWR processing) of the computer system 1 according to the second embodiment. Only differences from the first embodiment will be described. First, in the thin-pro BEWR processing, when transferring the write data from the CM 141 to the BE DXBF 154, the MP 131 obtains the LDEV LBA according to the VVOL LBA and the address mapping table 1423 on the SM 142 (Step 3201). The MP 131 obtains the physical LBA according to the obtained LDEV LBA and the configuration information management table 1422 on the SM 142 (Step 3203), and conducts the BEWR processing in the first embodiment (Step 3205).

Figure 33:
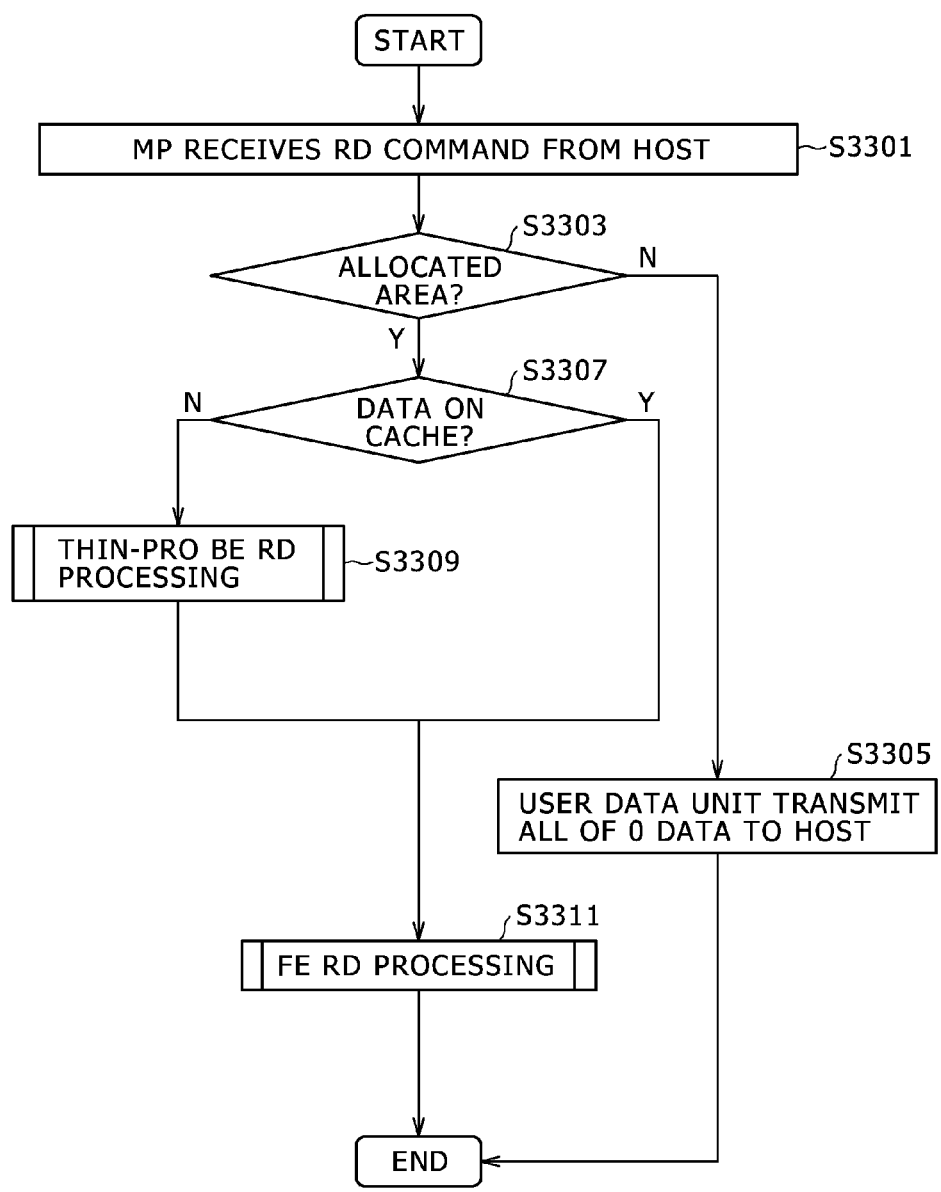
FIG. 33 is a flowchart illustrating host read processing according to the second embodiment.

FIG. 33 is a flowchart illustrating host read processing (thin-pro read processing) in the computer system 1 according to the second embodiment. Upon receiving the host read command from the host 10 (Step 3301), the MP 131 investigates whether the LDEV LBA has been allocated to the VVOL LBA that has received a read request from the host 10, or not, according to the address mapping table 1423 on the SM 142 (Step 3303). If there is the read request to the unallocated block (N in Step 3303), the MP 131 instructs the FE DMA 113 to create data in the overall user data portion 410 in FIG. 4 is 0. The MP 131 transmits the data created by the FE DMA 113 to the host 10 (Step 3305), and completes the read processing.

If there is the read request to the allocated area (Y in Step 3303), the MP 131 investigates whether the corresponding data is present on the CM 141, or not, according to the cache management table 1421 on the SM 142 (Step 3307). In the case of the second embodiment, the LDEV# and the LDEV LBA of the cache management table are changed to the VVOL# and the VVOL LBA. If the corresponding data is present on the CM 141 (Y in Step 3307), the same FERD processing as that of the first embodiment is conducted (Step 3311). If no corresponding data is present on the CM 141, the thin-pro BERD processing is conducted (Step 3309), and the same FERD processing as that in the first embodiment is conducted (Step 3311).

Figure 34:
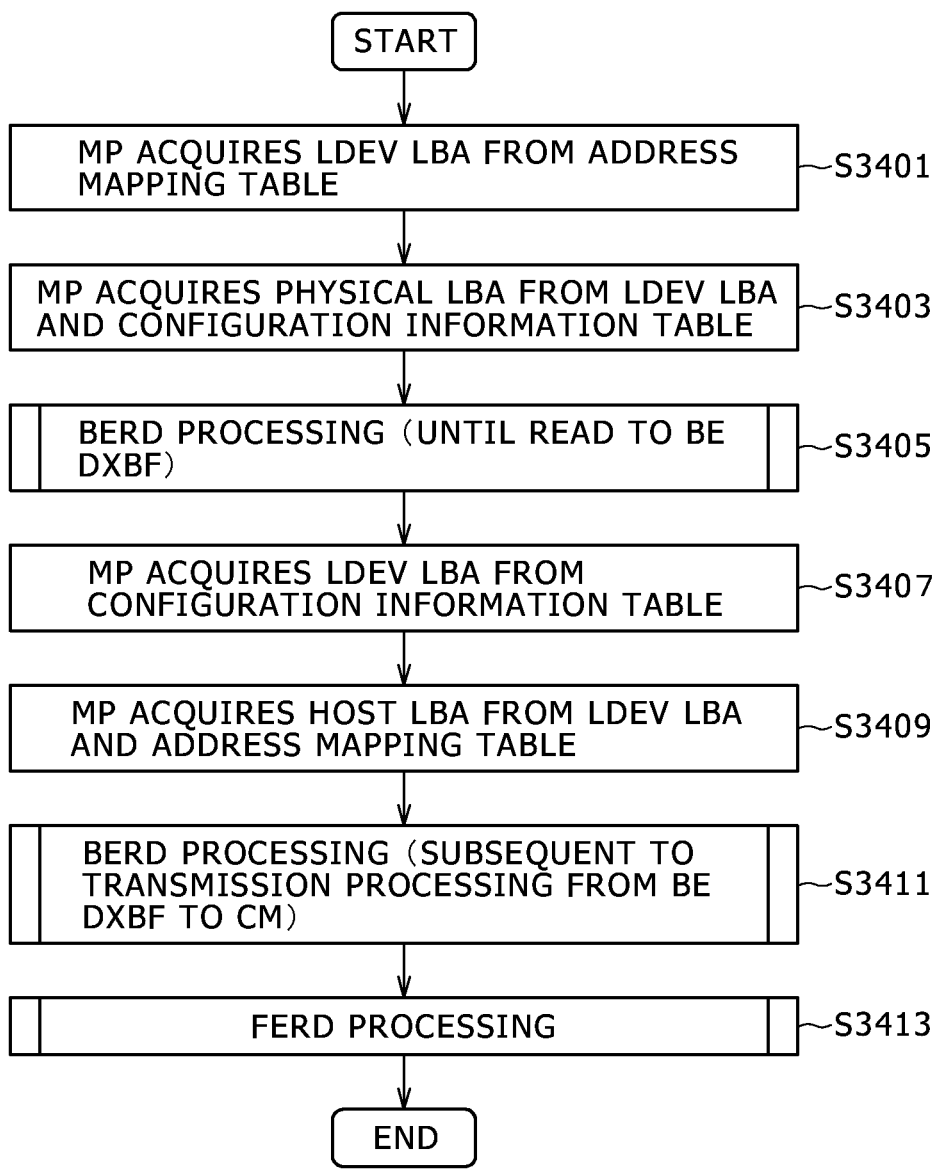
FIG. 34 is a flowchart illustrating host read processing according to the second embodiment.

FIG. 34 is a flowchart illustrating the BERD (thin-pro BERD) processing in the computer system 1 according to the second embodiment. In order to create the drive write command 1500, the MP 131 acquires the LDEV LBA according to the VVOL LBA and the address mapping table 1423 on the SM 142 (Step 3401). The MP 131 acquires the physical LBA according to the acquired LDEV LBA and the configuration information table 1422 on the SM 142 (Step 3402). After acquiring the physical LBA, the MP 131 conducts the same BERD processing as that in the first embodiment from Step 2201 to Step 2215 in FIG. 22. Thereafter, the MP 131 acquires the LDEV LBA according to the physical LBA and the configuration information table 1422 on the SM 142 (Step 3407). The MP 131 acquires the VVOL LBA according to the acquired LDEV LBA, and the address mapping table 1423 on the SM 142 (Step 3409). After acquiring the VVOL LBA, the MP 131 conducts the same BERD processing as that in the first embodiment from Step 2215 to Step 2223 in FIG. 22, and thereafter conducts the same FERD processing as that in the first embodiment.

Figure 35:
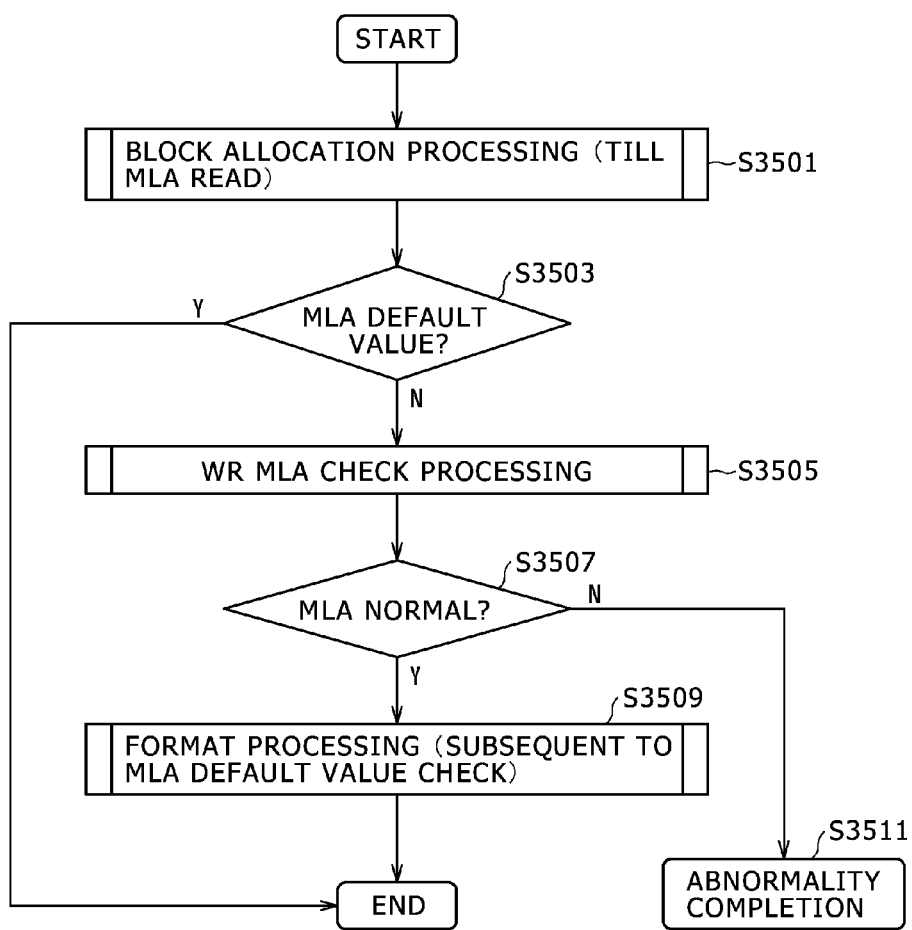
FIG. 35 is a flowchart illustrating VVOL block allocation deletion processing according to the second embodiment.

FIG. 35 is a flowchart illustrating the VVOL block allocation deletion processing in the computer system 1 according to the second embodiment. The VVOL block allocation deletion processing is processing for efficiently using the physical capacity of the drive device 180. That is, the VVOL blocks 361 to which the LDEV block 311-1 in FIG. 27 is allocated can accept nothing other than the read/write with respect to the VVOL blocks 361 because the MLA using the VVOL LBA information indicative of the VVOL block 2361 is written in the physical LBA corresponding to the LDEV block 311-1 even if the host 10 does not write data into the VVOL blocks 361. Therefore, because the LDEV block allocated to an unused VVOL block is reused to another VVOL block, the VVOL block allocation deletion processing is required. A start moment of the VVOL block allocation processing is when the host 10 deletes the VVOL block.

In the VVOL block allocation deletion processing, the storage device 100 executes Step 3105 to Step 3111 in the VVOL block allocation processing of FIG. 31 (Step 3501). The drive controller 181 confirms whether the MLA is the default value, or not (Step 3503). If the MLA of the physical LBA to be subjected to the allocation deletion is not the default value (N in Step 3503), the drive controller 181 conducts the write MLA inspection processing in the first embodiment (Step 3505). As in the write MLA inspection processing in the first embodiment, the drive controller 181 can implement both or any one of the processing in FIGS. 16 and 17, and arbitrarily conduct the processing of FIG. 18. The drive controller 181 confirms whether the results of the MLA inspection processing are normal, or not, (Step 3507), and if the MLA is normal (Y in Step 3507, the BE DXBF 154 conducts the initialization processing (Step 1107 in FIG. 11) of a target block (Step 3509). Also, if the drive controller 181 determines that the MLA is abnormal (N in Step 3507), the MP 131 abnormally terminates the VVOL block allocation deletion processing (Step 3511).

Figure 36:
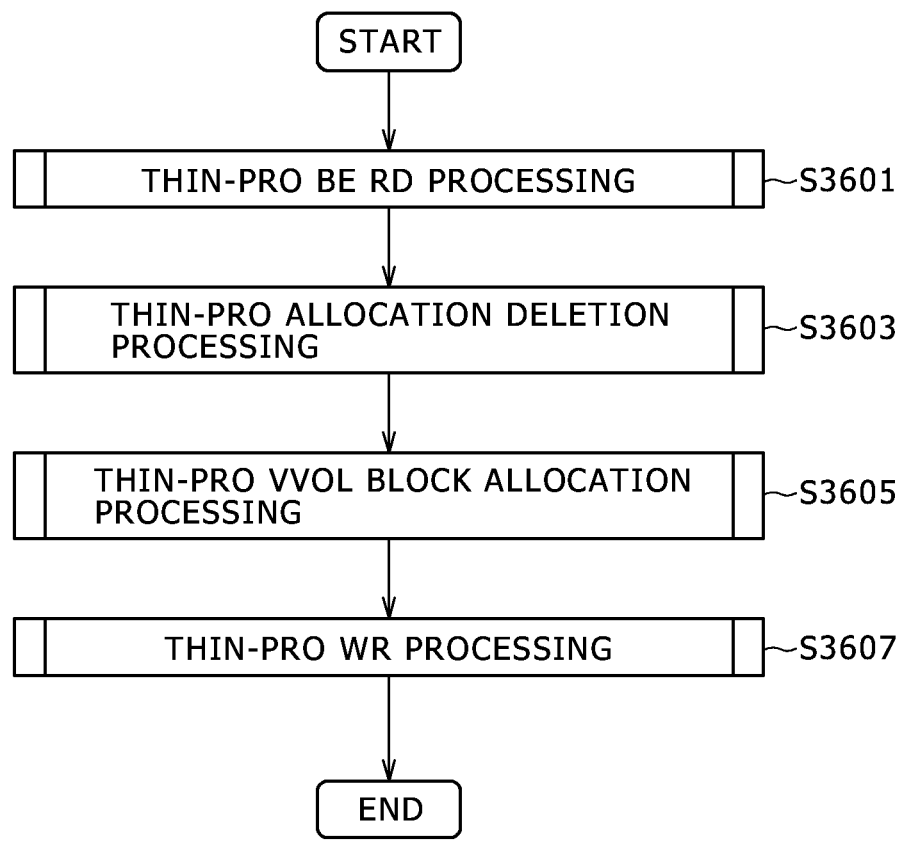
FIG. 36 is a flowchart illustrating VVOL block allocation change processing according to the second embodiment.

FIG. 36 is a flowchart illustrating the VVOL block allocation change processing in the computer system 1 according to the second embodiment. The VVOL block allocation change processing is conducted when the LDEV block quantity allocated to the VVOL 360 is leaned among the LDEVs 310 due to a change in the number of LDEVs 310 in the pool 350, or when the LDEV block that has been already allocated to the VVOL 360 is changed to another LDEV block in the pool 350 with the deletion of the LDEV 310 in the pool 350. The storage device 100 reads the data of the LDEV block to be moved in the CM 141 through the BERD processing of the first embodiment (Step 2201 to Step 2223 in FIG. 22) (Step 3601). After reading data in the CM 141, the storage device 100 conducts the allocation detection processing of the movement source LDEV block (all steps in FIG. 35) (Step 3603).

After the allocation deletion, the VVOL block allocation processing (all steps in FIG. 31) is conducted on the LDEV block of the movement destination (Step 3605). The thin-pro BEWR processing (all steps in FIG. 32) is conducted, and the LDEV block in the cache is written into the drive device (Step 3607). When changing the VVOL block allocation, the address mapping table 1423 on the SM 142 is updated. However, when a read request or a write request is generated immediately before updating, there is a possibility that the read/write processing is conducted with the use of the VVOL block allocation processing before updating, resulting in a problem that accurate data may not be read, or another data may be corrupted. This problem arises because the address conversion is conducted, and therefore the correspondence relationship between the host LBA and the physical LBA are not fixed. In the present invention, the FLA created from the host LBA is also used in addition to the BLA created from the past physical LBA with the results that even if the correspondence relationship between the host LBA and the physical LBA is changed, there is advantageous in that an address conversion error can be detected.

Several embodiments have been described above. However, the present invention is not limited to those embodiments, but can be variously changed without departing from the spirit of the invention.

Also, according to the above-mentioned several embodiments, there can be provided the storage device that can detect the abnormality of the logical address, more enhances the reliability of data, and suits for a mission critical business. Also, when the above-embodiments are applied to a storage device equipped with the drive devices 180 that conduct arithmetic operation, the reliability of data can be improved without increasing the load of the DKC 190, that is, while keeping the high-speed I/O performance.

What is claimed is:

1. A storage device comprising:
    a plurality of drives each having a storage medium configuring a logical volume provided to a host device;
    a front end I/F that is connected to the host device, and receives an I/O request including a logical address for identifying a logical storage area of the logical volume, and user data from the host computer;
    a first processor that is connected to the front end I/F, and controls a conversion from the logical address into the physical address for identifying a physical storage area of the storage medium; and
    a back end I/F that is connected to the first processor and the plurality of storage media, and controls write/read of the user data with respect to the plurality of drives on the basis of the physical address,
    wherein, in the drives, data, in which a first guarantee code obtained on the basis of the physical address and the logical address corresponding to the physical address is added to the user data, is stored in the physical storage area designated by the physical address of the storage medium.

2. The storage device according to claim 1,
wherein the plurality of drives each have a second processor, and the second processor of one of the drives calculates the first guarantee code, and
wherein, upon receiving a read/write command of data, one of the second processors reads data from the physical address designated by the read/write command, and detects an address abnormality on the basis of the physical address, the logical address corresponding to the physical address, and the first guarantee code added to the read data.

3. The storage device according to claim 2,
wherein the first guarantee code is an XOR value of a second guarantee code calculated on the basis of the physical address and a third guarantee code calculated on the basis of the logical address corresponding to the physical address.

4. The storage device according to claim 3,
wherein the back end I/F adds the second guarantee code to the user data, and transmits data, in which the second guarantee code is added to the user data, and a command including the physical address and the third guarantee code to the drives, and
wherein one of the second processors calculates the first guarantee code according to the second guarantee code and the third guarantee code, and adds the first guarantee code instead of the second guarantee code to the user data.

5. The storage device according to claim 2,
wherein, upon receiving a write request and the user data from the host device, the front end I/F calculates a third guarantee code on the basis of the logical address responsive to the write request, and adds the third guarantee code to the user data,
wherein the first processor converts the logical address responsive to the write request into the physical address, and calculates a fourth guarantee code on the basis of the logical address responsive to the write request, and
wherein, upon confirming that the third guarantee code matches the fourth guarantee code, the back end I/F calculates hc a second guarantee code on the basis of the physical address, and adds the second guarantee code to the user data, and transmits a command including the physical address, the third guarantee code, and data added with the second guarantee code to the drives.

6. The storage device according to claim 2,
wherein, upon receiving a command including a format processing instruction, at least one of the second processors stores default data, in which a value determined as a default value of the guarantee code is added to format data, in the storage medium thereof, and
wherein, upon receiving the read/write command of the data, one of the second processors does not detect the address abnormality when the read data is the default data.

7. The storage device according to claim 2,
wherein the plurality of storage media configure a pool volume,
wherein a pool storage area of the pool volume is dynamically allocated to the logical storage area of the logical volume according to a write request from the host device, and
wherein the first processor converts the logical address into an address of the corresponding pool volume, and converts the address of the pool volume into the physical address.

8. A method for controlling a storage device, comprising:
providing a logical volume configured by a plurality of storage media included in a plurality of drives to a host device;
receiving an I/O request including a logical address for identifying a logical storage area of the logical volume and user data from the host computer;
converting the logical address into a physical address for identifying a physical storage area of the storage media, and controlling a write/read of the user data with respect to the plurality of drives on the basis of the physical address; and
storing data, in which a first guarantee code obtained on the basis of the physical address and the logical address corresponding to the physical address is added to the user data, in the physical storage area designated by the physical address of the storage media.

9. The method for controlling the storage device according to claim 8,
wherein, upon receiving a read/write command of data, the data is read from the physical address designated by the read/write command, and an address abnormality is detected on the basis of the physical address, the logical address corresponding to the physical address, and the first guarantee code added to the read data.

10. The method for controlling the storage device according to claim 9,
wherein the first guarantee code is an XOR value of a second guarantee code calculated on the basis of the physical address and a third guarantee code calculated on the basis of the logical address corresponding to the physical address.

11. The method for controlling the storage device according to claim 10,
wherein data, in which the second guarantee code is added to the user data, and a command including the physical address and the third guarantee code are transmitted to the drives, and
wherein the first guarantee code calculated according to the second guarantee code and the third guarantee code is added to the user data instead of the second guarantee code.

12. The method for controlling the storage device according to claim 9,
wherein, upon receiving a write request and the user data from the host device, a third guarantee code is calculated on the basis of the logical address responsive to the write request, and the third guarantee code is added to the user data,
wherein the logical address responsive to the write request is converted into the physical address, and a fourth guarantee code is calculated on the basis of the logical address responsive to the write request, and
wherein, upon confirming that the third guarantee code matches the fourth guarantee code, a second guarantee code is calculated on the basis of the physical address, the second guarantee code is added to the user data, and a command including the physical address, the third guarantee code, and data added with the second guarantee code are transmitted to the drives.

13. The method for controlling the storage device according to claim 9, wherein, upon receiving a command including a format processing instruction, default data, in which a value determined as a default value of the guarantee code is added to format data, is stored in the storage media, and wherein, upon receiving the read/write command of the data, the address abnormality is not detected when the read data is the default data.

14. The method for controlling the storage device according to claim 9, wherein the plurality of storage media configure a pool volume, wherein a pool storage area of the pool volume is dynamically allocated to the logical storage area of the logical volume according to a write request from the host device, wherein the logical address is converted into an address of the corresponding pool volume, and wherein the address of the pool volume is converted into the physical address.

* * * * *